US010613538B2

(12) United States Patent
Asukai et al.

(10) Patent No.: US 10,613,538 B2
(45) Date of Patent: Apr. 7, 2020

(54) MOBILE BODY CONTROL SYSTEM, CONTROL METHOD, AND STORAGE MEDIUM

(71) Applicant: SONY CORPORATION, Tokyo (JP)

(72) Inventors: Masamichi Asukai, Kanagawa (JP); Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 207 days.

(21) Appl. No.: 15/565,221

(22) PCT Filed: Jan. 20, 2016

(86) PCT No.: PCT/JP2016/051617
§ 371 (c)(1),
(2) Date: Oct. 9, 2017

(87) PCT Pub. No.: WO2016/170808
PCT Pub. Date: Oct. 27, 2016

(65) Prior Publication Data
US 2018/0081365 A1 Mar. 22, 2018

(30) Foreign Application Priority Data

Apr. 22, 2015 (JP) .................................. 2015-087474

(51) Int. Cl.
*B25J 11/00* (2006.01)
*G05D 1/02* (2020.01)
*B25J 5/00* (2006.01)

(52) U.S. Cl.
CPC .............. *G05D 1/0212* (2013.01); *B25J 5/00* (2013.01); *B25J 11/0005* (2013.01); *G05D 1/0246* (2013.01); *Y10S 901/01* (2013.01)

(58) Field of Classification Search
CPC .. G05D 1/0212; Y10S 901/01; B25J 11/0005; G01S 3/00; G10L 25/63
(Continued)

(56) References Cited

U.S. PATENT DOCUMENTS 6,175,772 B1 * 1/2001 Kamiya ................. G06N 3/008
700/31
8,751,042 B2 * 6/2014 Lee .......................... G06N 5/02
700/246

(Continued)

FOREIGN PATENT DOCUMENTS

EP 2112621 A2 10/2009
JP 2005-313308 A 11/2005
(Continued)

OTHER PUBLICATIONS

Fudewaki, et al., "Maai Control for Humanoid Robots by Accumulation of Uncomfortable Feelings", pp. 04, date not available.
(Continued)

*Primary Examiner* — Dalena Tran
(74) *Attorney, Agent, or Firm* — Chip Law Group

(57) ABSTRACT

Provided is a mobile body control system, a control method, and a storage medium in which a mobile body can move to an appropriate angle and distance in accordance with emotion of a communication target. Provided is a mobile body control system that includes a moving unit that moves; a measuring unit that measures an angle and a distance with a target (2) which is a communication target; an emotion estimating unit that estimates an emotion of the target; and a control unit that controls the moving unit to move a mobile body (1) to an initial position with an appropriate angle and distance with respect to the target in accordance with the estimated emotion.

17 Claims, 28 Drawing Sheets

(58) Field of Classification Search
USPC .................. 700/253, 245, 259; 382/115–118
See application file for complete search history.

(56) References Cited

U.S. PATENT DOCUMENTS

| | | | |
|---|---|---|---|
| 2008/0221730 A1* | 9/2008 | Sakata | ................... G06N 3/004 |
| | | | 700/245 |
| 2009/0271031 A1 | 10/2009 | Kwon et al. | |
| 2014/0039680 A1* | 2/2014 | Angle | ..................... B25J 5/007 |
| | | | 700/259 |

FOREIGN PATENT DOCUMENTS

| | | |
|---|---|---|
| JP | 2006-247780 A | 9/2006 |
| JP | 2009-266200 A | 11/2009 |
| JP | 2011-000681 A | 1/2011 |
| JP | 2012-161851 A | 8/2012 |
| JP | 2012-213828 A | 11/2012 |
| KR | 10-2009-0112213 A | 10/2009 |

OTHER PUBLICATIONS

Tanaka et al., "The Anisotropic Structure of Personal Space", vol. XXI, No. 4, 1973, pp. 223-232, date not available.

Yamaura, et al., "Proposal of Person Detection with Regard to Familiarity-Oriented Robot" ITE Technical Report, vol. 30, No. 42, Aug. 2006, pp. 27-28.

Balasuriya, et al., "Giving Robots Some Feelings Towards Interaction with Humans in Ubiquitous Environment", Second International Conference on Industrial and Information Systems, ICIIS 2007, Aug. 8-11, 2007, pp. 529-534.

Aoki, et al., "Individual Distances a Small Mobile Robot Moves Towards Adult Female, The Case of Upright /Chair-Sitting", vol. 77, No. 674, Apr. 2012, pp. 767-774.

Fudewaki, et al., "Maai Control for Humanoid Robots by Accumulation of Uncomfortable Feelings", The 23rd Annual Conference of the Robotics Society of Japan Yokoshu CD-ROM, The Robotics Society of Japan, 2005, 4 pages, date not available.

Masako Tanaka, "The Anisotropic Structure of Personal Space", The Japanese Journal of Educational Psychology, vol. 21, Issue 4, 1973, pp. 223-223, date not available.

Balasuriya, et al., "Giving robots some feelings towards interaction with humans in ubiquitous environment", 2nd International Conference on Industrial and Information Systems 2007, Conference Proceedings, ICIIS 2007, Aug. 8-11, 2007, pp. 529-534.

Aoki, et al., "Individual distances a small mobile robot moves towards adult female, The case of upright/chair-sitting", Journal of Architecture and Planning, vol. 77, No. 674, pp. 767-774, date not available.

Fudewaki, et al., "Maai Control for Humanoid Robots by Accumulation of Uncomfortable Feelings", The 23rd Annual Conference of the Robotics Society of Japan Yokoshu CD-ROM, The Robotics Society of Japan, 04 pages, date not available.

Tanaka, et al., "The Anisotropic Structure of Personal Space", Kyoiku Shinrigaku Kenkyu, vol. 21, No. 4, 1973, pp. 223-232, date not available.

International Search Report and Written Opinion of PCT Application No. PCT/JP2016/051617, dated Mar. 1, 2016, 11 pages of ISRWO.

\* cited by examiner

FIG. 2
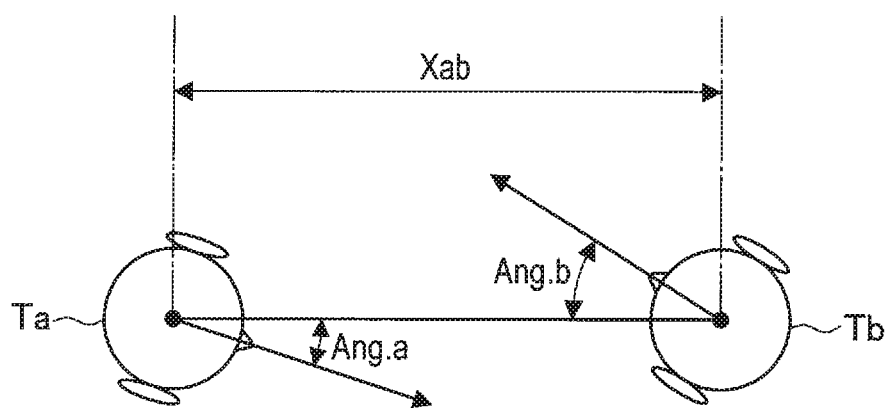
FACE-TO-FACE
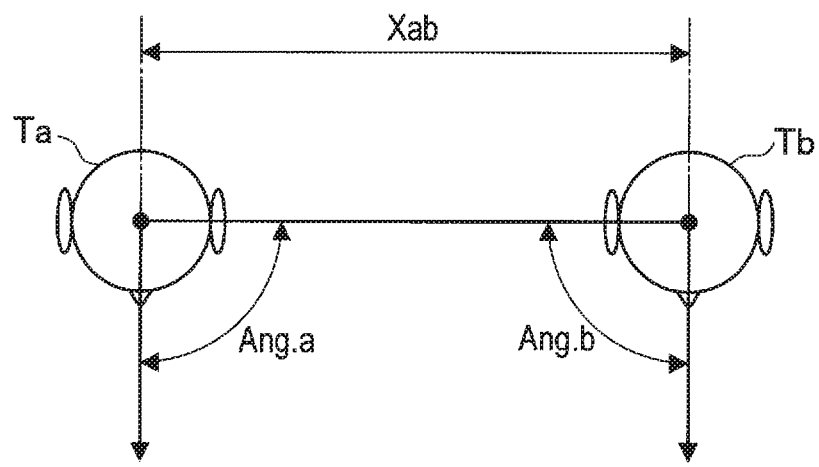
SIDE-BY-SIDE

FIG. 7
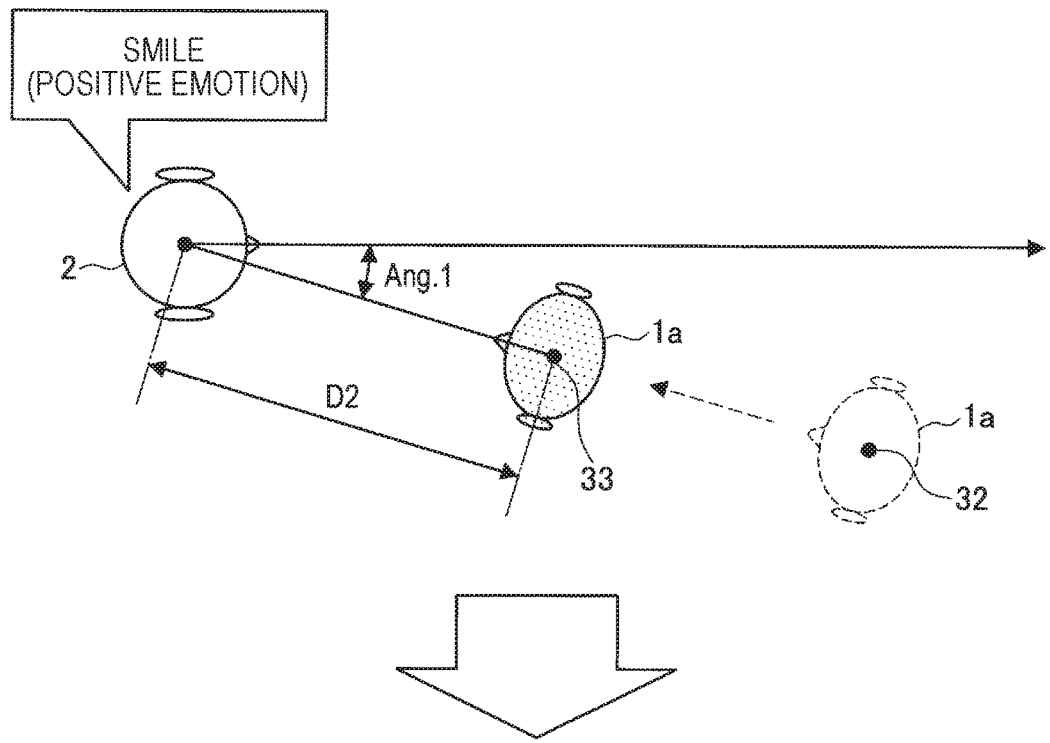
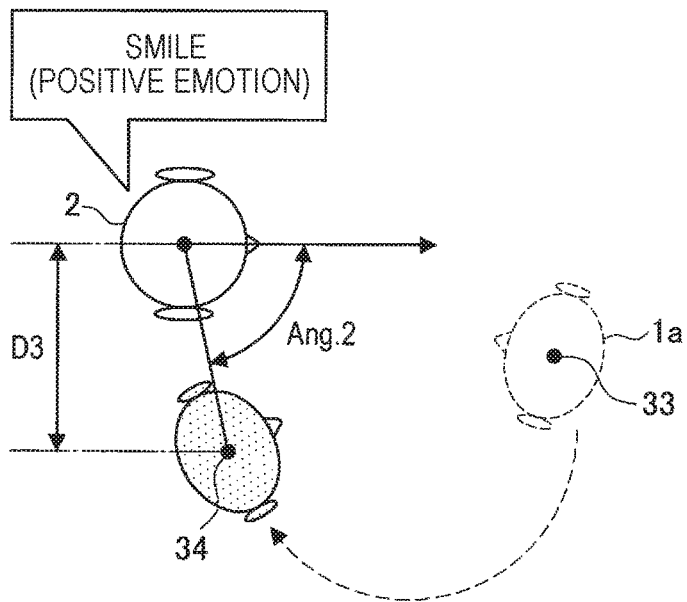

FIG. 9
PARTNER BACKS AWAY
WHEN APPROACHING
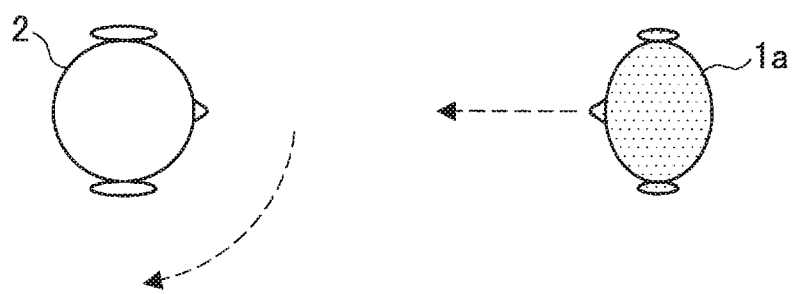
PARTNER LOOKS AWAY
WHEN APPROACHING FIG. 20
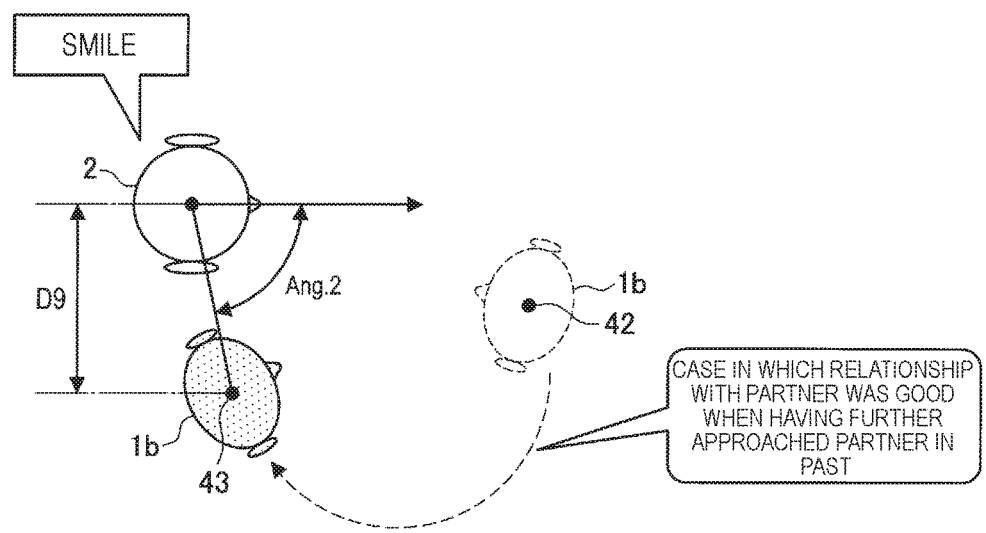
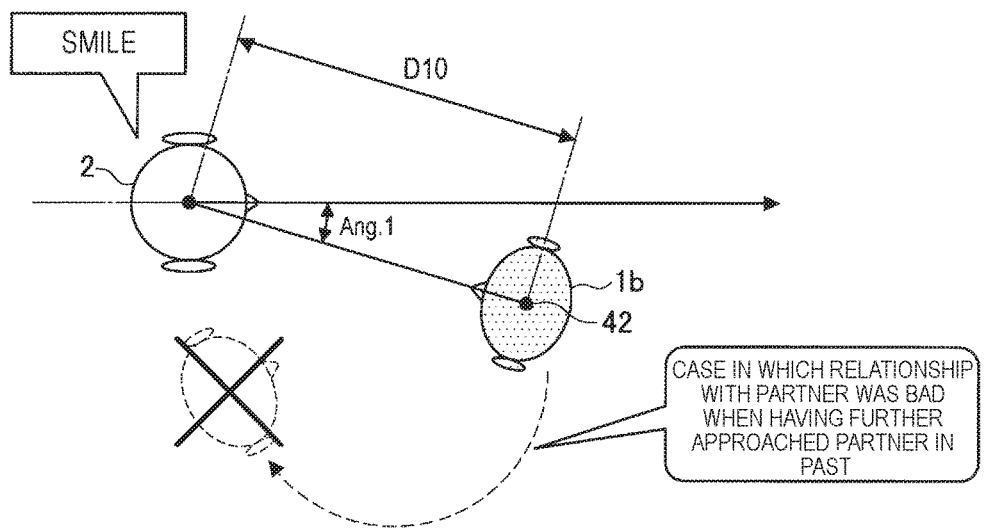

FIG. 28
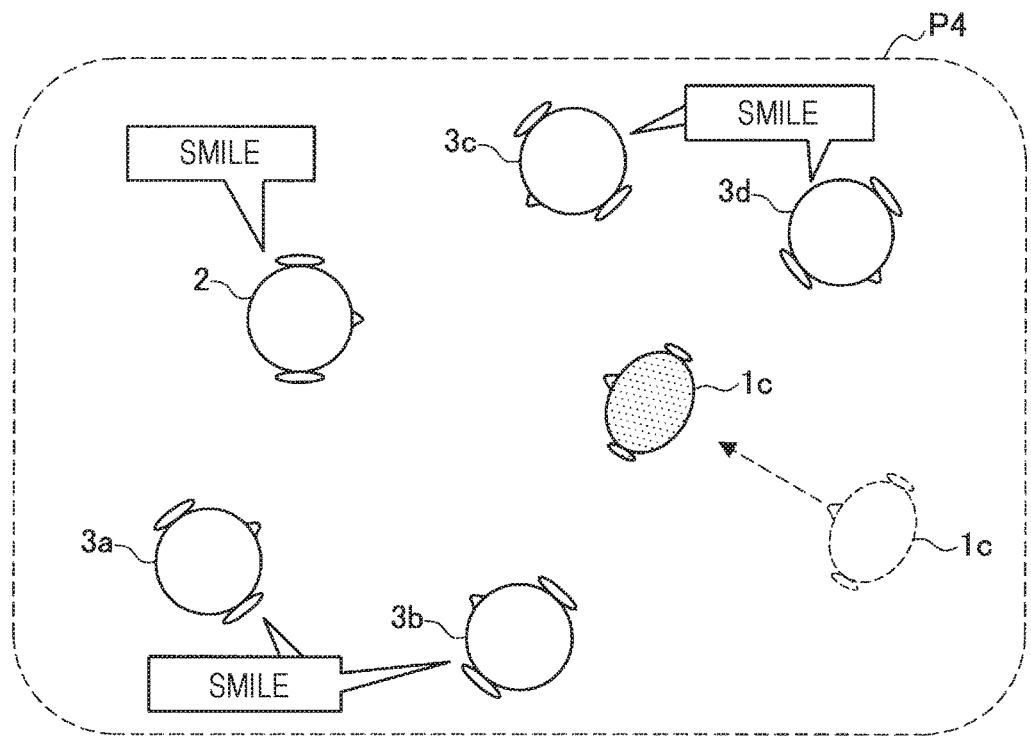
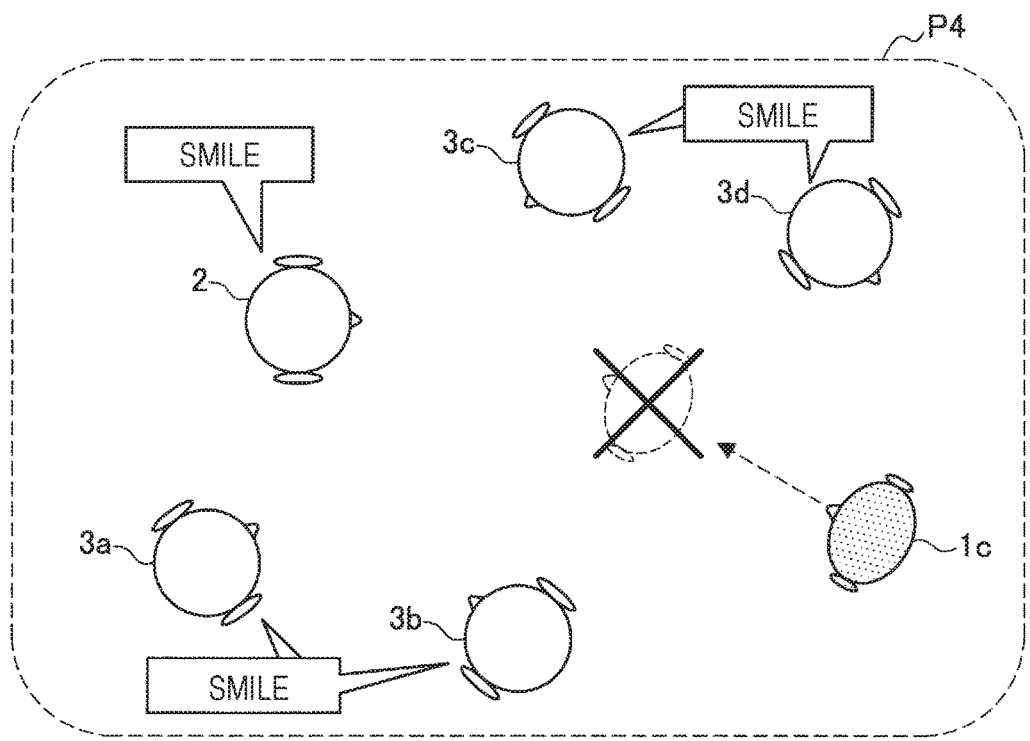

FIG. 29
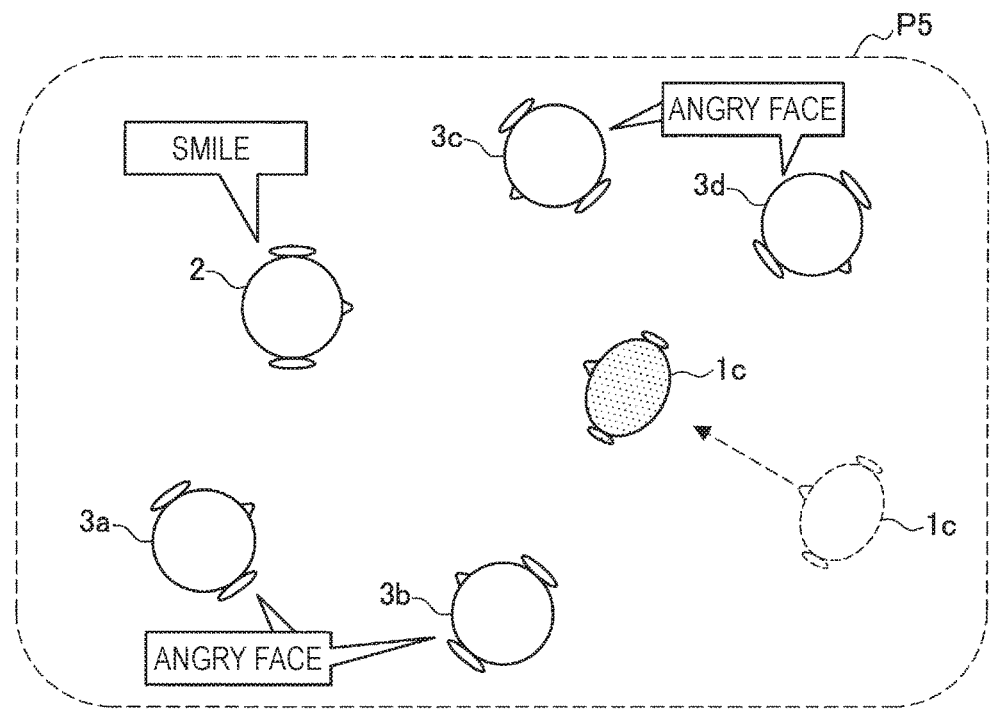
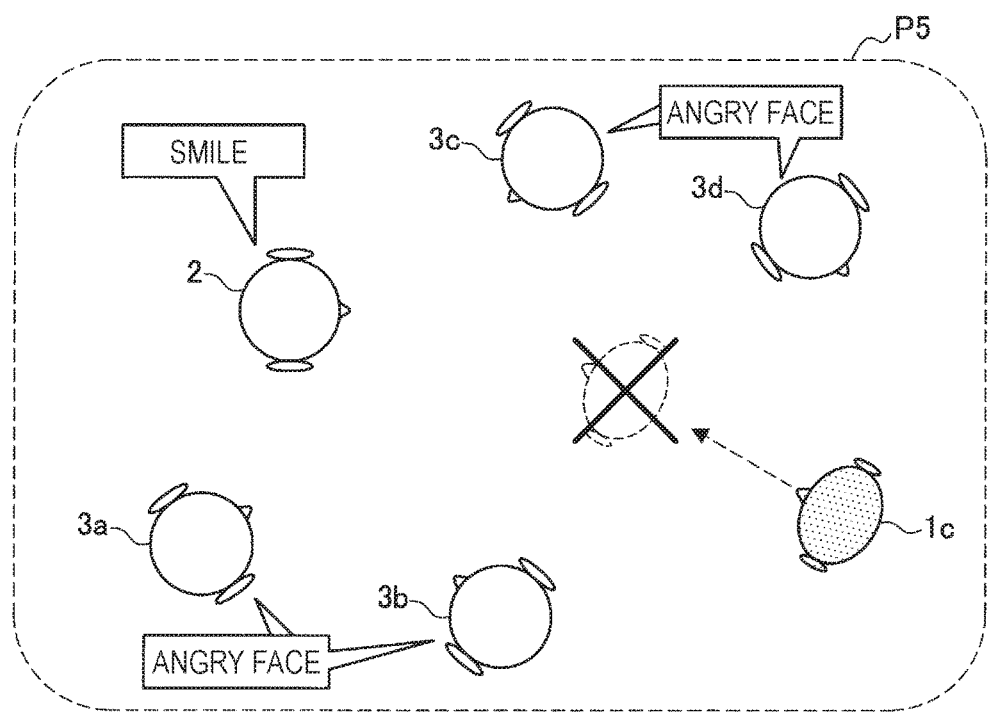

MOBILE BODY CONTROL SYSTEM, CONTROL METHOD, AND STORAGE MEDIUM

CROSS REFERENCE TO RELATED APPLICATIONS

This application is a U.S. National Phase of International Patent Application No. PCT/JP2016/051617 filed on Jan. 20, 2016, which claims priority benefit of Japanese Patent Application No. JP 2015-087474 filed in the Japan Patent Office on Apr. 22, 2015. Each of the above-referenced applications is hereby incorporated herein by reference in its entirety.

TECHNICAL FIELD

The present disclosure relates to a mobile body control system, a control method, and a storage medium.

BACKGROUND ART

Recently, robots that verbally or nonverbally communicate with people have been proposed and are likely to increase in the future. In communication between people and robots, it is necessary to secure adequate personal space for people to occupy comfortably. Comfortable personal space varies for each person, but in human-to-human communication, people learn from each other how much distance should be kept and maintain comfort.

With respect to a robot that communicates with a person, for example, Patent Literature 1 below discloses a robot that calculates parameters for an optimal communication action on the basis of a moving distance and a facial orientation of a person during communication and secures appropriate personal space that an interaction partner can occupy comfortably or adjusts a frequency of matching a gaze with the partner.

Further, Patent Literature 2 below discloses a robot that adjusts a type of spoken content, a conversation distance, or a time for which eye contact is maintained in accordance with sensing familiarity based on a conversation distance with a communication target, a gaze position, a facial expression, and other sensing information.

CITATION LIST

Patent Literature

Patent Literature 1: JP 2006-247780A
Patent Literature 2: JP 2011-000681A

DISCLOSURE OF INVENTION

Technical Problem

However, with the number of communication robots set to increase in the future, a technology that sufficiently takes into consideration the psychological influences such as stress that robots give to people has not been proposed. For example, when robots communicate with people, it is expected to cause people stress due to actions that would not occur between people, such as when a robot surprises a person by suddenly appearing in front of them and approaching them. Even if a robot can understand a person's emotion, the robot not performing an appropriate action with respect to the emotion that would be performed by a human can be a source of stress.

Although a technology of adjusting a distance with a person to secure appropriate personal space with the person has been proposed in both of the above patent literatures, controlling a relative angle with respect to the person is not mentioned. For example, even at the same distance, a robot gives a different psychological influence to a person depending on whether the robot is in front of, obliquely in front of, beside, or behind the communication partner.

Thus, the present disclosure proposes a mobile body control system, a control method, and a storage medium in which a mobile body can move to an appropriate angle and distance in accordance with emotion of a communication target.

Solution to Problem

According to the present disclosure, there is provided a mobile body control system including: a moving unit configured to move; a measuring unit configured to measure an angle and a distance with a target which is a communication target; an emotion estimating unit configured to estimate an emotion of the target; and a control unit configured to control the moving unit to move a mobile body to an initial position with an appropriate angle and distance with respect to the target in accordance with the estimated emotion.

According to the present disclosure, there is provided a control method including: measuring, by a measuring unit, an angle and a distance with a target which is a communication target; estimating an emotion of the target; and controlling a moving unit, by a control unit, to move a mobile body to an initial position with an appropriate angle and distance with respect to the target in accordance with the estimated emotion.

According to the present disclosure, there is provided a storage medium having a program stored therein, the program causing a computer to function as: a moving unit configured to move; a measuring unit configured to measure an angle and a distance with a target which is a communication target; an emotion estimating unit configured to estimate an emotion of the target; and a control unit configured to control the moving unit to move a mobile body to an initial position with an appropriate angle and distance with respect to the target in accordance with the estimated emotion.

Advantageous Effects of Invention

As described above, according to the present disclosure, a mobile body can move to an appropriate angle and distance in accordance with emotion of a communication target.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a view for describing an interpersonal angle, face-to-face, and side-by-side according to the present embodiment.

FIG. 7 is a view for describing movement control of the mobile body in a case in which a target person has a positive emotion according to the first embodiment.

FIG. 9 is a view for describing another type of movement stop control of the mobile body according to the first embodiment.

FIG. 20 is a view for describing an example of controlling movement to a side-by-side position based on a communication history according to the second embodiment.

FIG. 28 is a view illustrating an example of movement control based on a communication history according to the third embodiment.

FIG. 29 is a view illustrating an example of movement control based on a communication history according to the third embodiment.

MODE(S) FOR CARRYING OUT THE INVENTION

Figure 1:
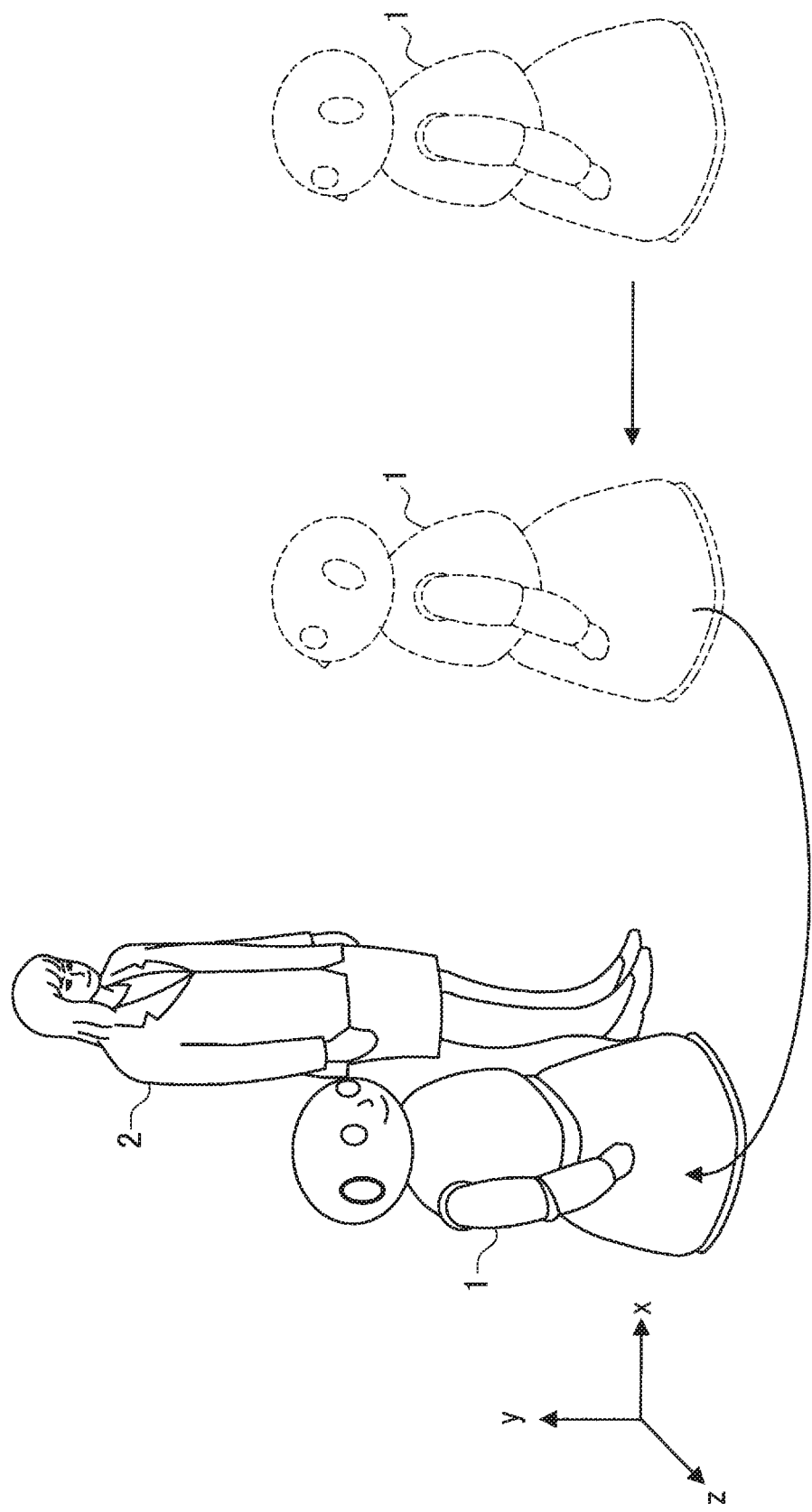
FIG. 1 is a view for describing an overview of a mobile body control system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. Overview of mobile body control system according to embodiment of the present disclosure
2. Embodiments
2-1. First embodiment
2-2. Second embodiment
2-3. Third embodiment
3. Summary «1. Overview of Mobile Body Control System According to Embodiment of Present Disclosure»

First, an overview of a mobile body control system according to an embodiment of the present disclosure will be described with reference to FIG. 1. As illustrated in FIG. 1, a mobile body control system according to the present embodiment is a system that controls motion of a mobile body 1 realized by a communication robot capable of moving on an x-axis and a z-axis, for example. The mobile body 1 includes various sensors such as a camera and a microphone, recognizes a target person 2 on the basis of a captured image or collected voice, and senses speech or a facial expression of the target person 2. Further, the mobile body 1 includes an output device such as a speaker and is capable of verbally or nonverbally communicating with a person by responding with a voice output, a display output, or motion in accordance with a result of the sensing.

Here, when a communication robot communicates with a person, it is expected to cause stress to the person due to the robot suddenly appearing in front of the person and approaching the person or entering the person's personal space in a state in which the person is not familiar with the robot. Also, because personal space varies for each person or interpersonal relationship, always keeping the same distance is not appropriate.

In consideration of the above problem, a mobile body control system according to an embodiment of the present disclosure enables appropriate communication by moving to an appropriate angle and distance in accordance with an emotion of a communication target without causing the target person stress.

Specifically, as illustrated in FIG. 1, the mobile body 1 moves to an appropriate interpersonal distance and interpersonal angle with the target person 2 in accordance with an emotion of the target person 2, who is a communication target. For example, at the start of communication, the mobile body 1 moves to a position having an interpersonal angle of about 0 to 20° and an interpersonal distance of about 1 m with respect to the target person 2 in a front direction facing the target person 2. Here, with respect to an interpersonal distance that takes into consideration the psychological stress given to the target person 2, the social psychological concept of an interpersonal distance is used in addition to the biological concept of personal space. The social psychological concept of an interpersonal distance includes, for example, a close distance (familiar relationship), an individual distance (a proximate phase: private communication with a close partner, a remote phase: informal communication), a social distance (official communication), and the like, and a person feels stress when an interpersonal distance and an interpersonal relationship do not match. For example, a person feels stress when the person is at a close distance or an individual distance with an unfamiliar person in a crowded train. In the present specification, the mobile body 1 is controlled using a remote phase of an individual distance of about 1 m, a proximate phase of the individual distance of about 50 cm, and a remote phase of a close distance of about 30 cm as examples of definitions according to the social psychological concept of interpersonal distances. Therefore, at the start of communication, the mobile body 1 first moves to a position of about 1 m, which is the remote phase of the individual distance, from the target person 2.

The emotion of the target person 2 is estimated on the basis of analysis of a facial expression from a captured image captured by the camera provided in the mobile body 1 and analysis of voice collected by the microphone.

Next, at a time point at which the mobile body 1 is moved to the position having an interpersonal angle of about 0 to 20° and a distance of about 1m with respect to the target person 2, in a case in which the target person 2 smiles as illustrated in FIG. 1 and can be estimated to have a positive emotion, the mobile body 1 further approaches the target person 2 and moves to a position side-by-side with the target person 2 to perform more familiar communication.

Further, when the mobile body 1 is side-by-side with the target person 2, the mobile body 1 adjusts an angle to face the same direction as the target person 2 to establish a more familiar relationship with the target person 2 without causing the target person 2 stress.

Although movement to the interpersonal distance and interpersonal angle for performing more familiar communication with the target person 2 in a case in which the target person 2 has a positive emotion is illustrated in the example illustrated in FIG. 1, the present embodiment is not limited thereto. For example, in a case in which the target person 2 has a negative emotion, the mobile body 1 keeps a long interpersonal distance with the target person 2 to keep away from the target person 2 or increases an interpersonal angle with respect to the target person 2 so as not to cause the target person 2 psychological stress.

Here, definitions of "interpersonal angle," "face-to-face," and "side-by-side" will be described with reference to FIG. 2. FIG. 2 is a view for describing the interpersonal angle, face-to-face, and side-by-side according to the present embodiment. As illustrated in the upper part of FIG. 2, for example, an interpersonal angle of a target Ta with respect to a target Tb is an angle Ang.a (−180° to 180°) formed between a vector from the target Ta to the target Tb and a forward vector of the target Ta. Similarly, an interpersonal angle of the target Tb with respect to the target Ta is an angle Ang.b (−180° to 180°) formed between a vector from the target Tb to the target Ta and a forward vector of the target Tb. An absolute value of each of Ang.a and Ang.b is an angle smaller than a predetermined value, and a case in which an absolute value of "Ang.a+Ang.b" is an angle smaller than the predetermined value is defined as "face-to-face in a broad sense," while a case in which an interpersonal distance Xab is further less than a predetermined distance (for example, the remote phase of the individual distance: about 1 m) is defined as "face-to-face."

Further, as illustrated in the lower part of FIG. 2, the absolute values of Ang.a and Ang.b are both about 90°, and a case in which an absolute value of "Ang.a+Ang.b" is an angle smaller than a predetermined value is defined as "side-by-side in a broad sense," while a case in which an interpersonal distance Xab is further less than a predetermined distance (for example, the proximate phase of the individual distance: about 50 cm) is defined as "side-by-side."

The overview of the mobile body control system according to an embodiment of the present disclosure has been described above. The shape of the mobile body 1 is not limited to the example illustrated in FIG. 1, and for example, the mobile body 1 may be a two-foot walking robot, a robot imitating the shape of an animal such as a dog or a cat, or a robot that can fly. Further, the mobile body 1 may be realized as a drone, in addition to a robot. Next, the mobile body control system of the present disclosure will be described in detail with reference to a plurality of embodiments.

《2. Embodiments》

<2-1. First Embodiment>

First, a first embodiment according to the present disclosure will be described with reference to FIGS. 3 to 14.

(2-1-1. Configuration)

Figure 3:
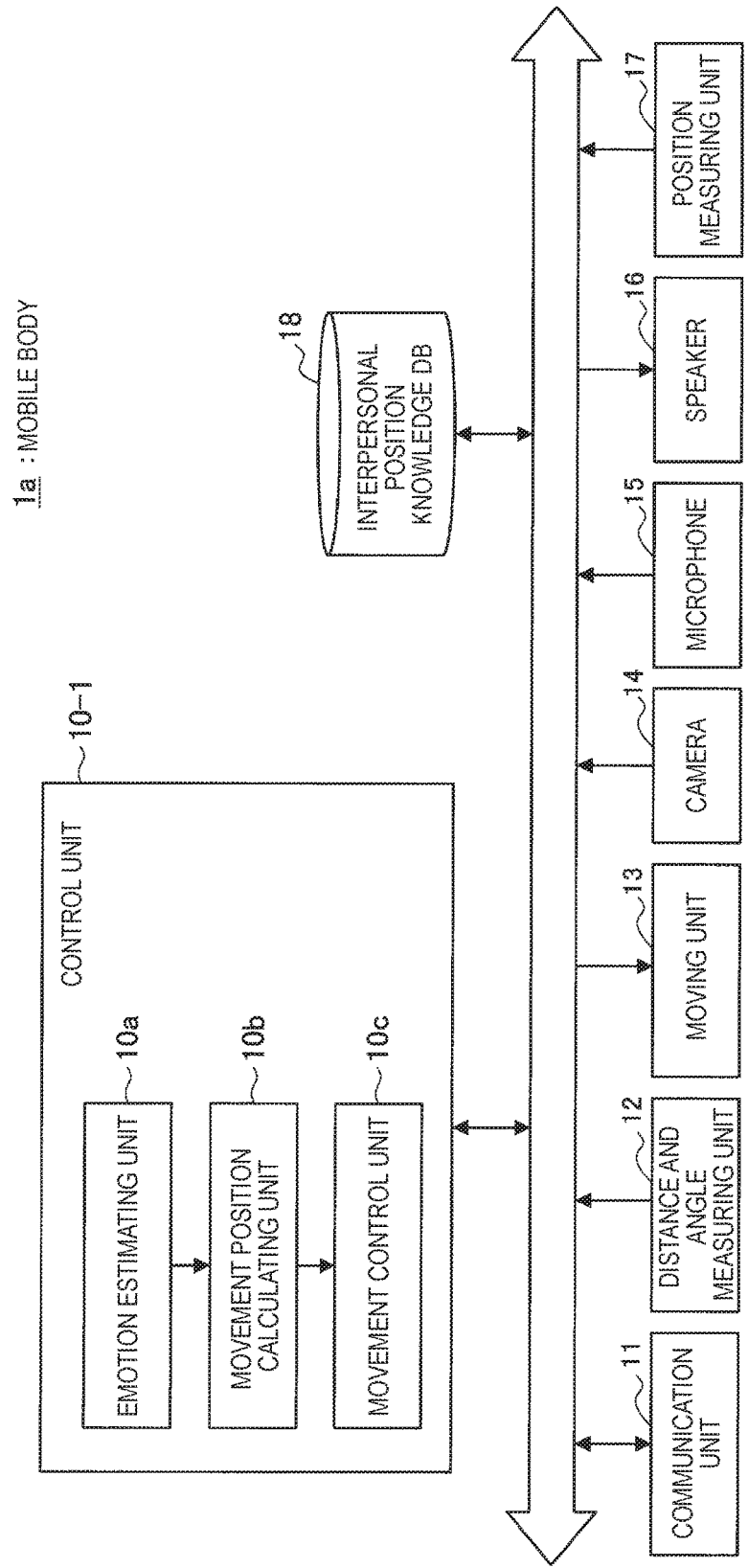
FIG. 3 is a block diagram illustrating an example of a configuration of a mobile body according to a first embodiment.

FIG. 3 is a block diagram illustrating an example of a configuration of a mobile body 1a according to the first embodiment. As illustrated in FIG. 3, the mobile body 1a according to the present embodiment includes a control unit 10-1, a communication unit 11, a distance and angle measuring unit 12, a moving unit 13, a camera 14, a microphone 15, a speaker 16, a position measuring unit 17, and an interpersonal position knowledge database (DB) 18.

The control unit 10-1 is configured by a microcomputer having a central processing unit (CPU), a read-only memory (ROM), a random access memory (RAM), and a nonvolatile memory and controls each configuration of the mobile body 1a. Further, as illustrated in FIG. 3, the control unit 10-1 functions as an emotion estimating unit 10a, a movement position calculating unit 10b, and a movement control unit 10c.

The emotion estimating unit 10a has a function of estimating an emotion of a communication target. Here, the emotion may be a basic emotion such as "joy" or "sorrow" or may be expressed as two-dimensional coordinates of valence (inducibility) and arousal (arousal level). More specifically, the emotion estimating unit 10a estimates an emotion using a mechanical learning method or the like on the basis of a result of analyzing a facial expression using a facial image of the target person 2 captured using the camera 14 or a result of analyzing posture or motion using a body image. The emotion estimating unit 10a may also estimate an emotion using a result of analyzing voice of the target person collected using the microphone 15 (for example, spoken content, a tone of voice, etc.). The emotion estimating unit 10a may also estimate an emotion on the basis of an interaction (receding, approaching, or the like) of the target person 2 with respect to motion of the mobile body 1a. The emotion estimated by the emotion estimating unit 10a may be a basic emotion such as "joy" or "sorrow" or may be an emotional value expressed as the two-dimensional coordinates of valence (inducibility) and arousal (arousal level) as described above. The emotion estimating unit 10a may estimate a positive emotion/negative emotion in accordance with the estimated specific emotion.

The movement position calculating unit 10b calculates an appropriate position to which the mobile body 1 moves on the basis of the emotion of the target person 2 estimated by the emotion estimating unit 10a. Specifically, for example, the movement position calculating unit 10b acquires an appropriate interpersonal distance and angle corresponding to the emotion of the target person 2 from the interpersonal position knowledge DB 18 and calculates a movement position of the mobile body 1.

Here, parameters (hereinafter referred to as interpersonal position knowledge data) for calculating an appropriate position (interpersonal distance and interpersonal angle) to which the mobile body 1a should subsequently move on the basis of the interpersonal distance and interpersonal angle between the target person 2 and the mobile body 1a and the emotion of the target person 2 are stored in the interpersonal position knowledge DB 18. For example, an initial position, a subsequent movement position from the initial position in a case in which the target person 2 has a positive emotion (emotions such as relief, curiosity, familiarity, and affection), and an interpersonal distance and an interpersonal angle of a subsequent movement position from the initial position in a case in which the target person 2 has a negative emotion (emotions such as tension, fear, and disgust) are stored in the interpersonal position knowledge DB 18. The initial position may be changed within a predetermined range in accordance with the emotion (positive/negative) of the target person 2.

The movement control unit 10c controls the moving unit 13 to move the mobile body 1a to the movement position calculated by the movement position calculating unit 10b. Here, the movement control unit 10c calculates a moving distance and direction to the movement position with reference to the current interpersonal distance and interpersonal angle measured by the distance and angle measuring unit 12 and performs movement control with respect to the moving unit 13.

The communication unit 11 has a function of transmitting and receiving data to and from an external device. For example, the communication unit 11 may include a first communication unit (so-called connection port) that is connected to another nearby information processing device by wired/wireless connection and a second communication unit that is connected to a network and connected to another information processing device connected via a predetermined server on the network or via the network.

The distance and angle measuring unit 12 has a function of measuring a distance (that is, an interpersonal distance) and an angle (that is, an interpersonal angle) between the mobile body 1 and the target person 2. For example, the distance and angle measuring unit 12 is realized by a stereo camera, a distance measuring sensor using infrared rays, or the like, and measures the interpersonal distance. Further, for example, the distance and angle measuring unit 12 finds a facial orientation of the target person 2 on the basis of the result of analyzing the facial expression using the captured image of the face of the target person 2 and calculates an interpersonal angle of the mobile body 1a with respect to a forward vector (facial orientation or body orientation) of the target person 2.

The moving unit 13 has a function of moving the mobile body 1, and specifically includes a moving mechanism and a power unit. In the present embodiment, the moving mechanism and the power unit are not particularly limited.

The camera 14 is an imaging unit that captures an image of surroundings of the mobile body 1 and may include a plurality of imaging units. Although an installation position of the camera 14 in the mobile body 1 is not particularly limited, the camera 14 may be installed at, for example, a chest portion, a forehead portion, and a temporal region of the mobile body 1.

The microphone 15 is a collecting unit that collects surrounding voice and outputs the surrounding voice as a voice signal to the control unit 10-1 and may be realized using, for example, a microphone array.

The speaker 16 is a voice output unit that converts a predetermined voice signal into voice and outputs the voice in accordance with control of the control unit 10-1. The speaker 16 may be realized using, for example, a speaker having directivity.

The position measuring unit 17 has a function of measuring the current position of the mobile body 1a on the basis of an acquisition signal from the outside. Specifically, for example, the position measuring unit 17 is realized using a Global Positioning System (GPS) positioning unit, receives radio waves from a GPS satellite, detects a position of the mobile body 1a, and outputs the detected position information to the control unit 10-1. Further, in addition to the GPS, the position measuring unit 17 may detect the position by, for example, transmission/reception via Wi-Fi (registered trademark), Bluetooth (registered trademark), etc. or short range communication.

The detailed configuration of the mobile body 1a according to the present embodiment has been described above. The configuration of the mobile body 1a according to the present embodiment is not limited to the example illustrated in FIG. 3, and for example, at least a portion of each function of the control unit 10-1 or the interpersonal knowledge DB 18 may be located on a cloud. In that case, the mobile body 1a may, for example, transmit a captured image to the cloud and receive an emotion estimation result.

Further, the mobile body 1a may include various motion sensors such as an acceleration sensor, a geomagnetic sensor, a gyro sensor, and the like, detect information on motion of the mobile body 1a, and use the detected information in movement control of the moving unit 13.

(2-1-2. Operation)

Figure 4:
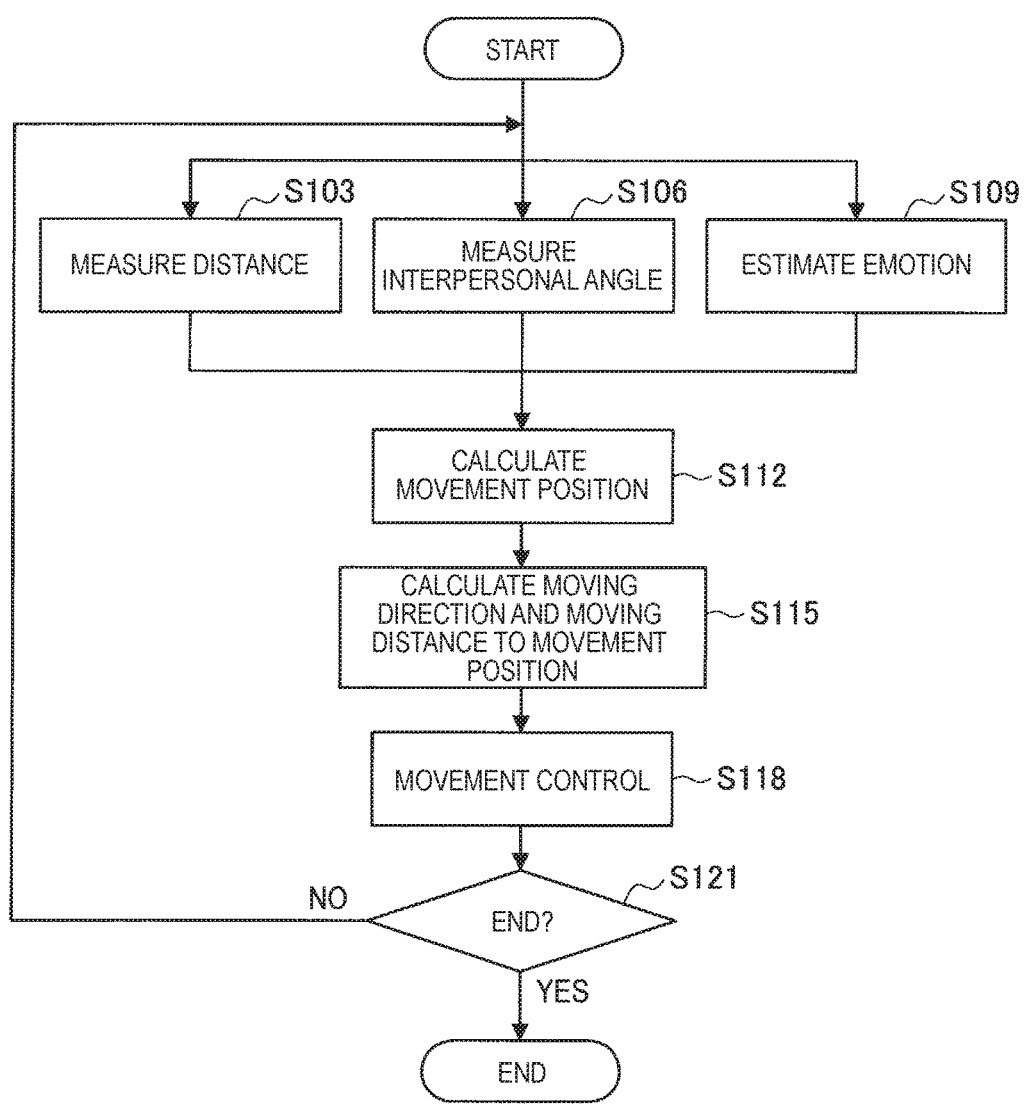
FIG. 4 is a flowchart illustrating a movement control process according to the first embodiment.

FIG. 4 is a flowchart illustrating a movement control process according to the first embodiment. As illustrated in FIG. 4, first, the control unit 10-1 of the mobile body 1a measures a distance between the mobile body 1a and the communication target person (the target person 2) with the distance and angle measuring unit 12 (step S103), measures an interpersonal angle of the mobile body 1a with respect to the target person 2 with the distance and angle measuring unit 12 (step S106), and estimates an emotion of the target person 2 with the emotion estimating unit 10a (step S109). Steps S103 to S109 may be performed at substantially the same time.

Next, the movement position calculating unit 10b of the mobile body 1a calculates a movement position with reference to the interpersonal position knowledge DB 18 on the basis of the estimated emotion (step S112).

Then, the movement control unit 10c calculates a moving direction and a moving distance to the calculated movement position on the basis of the current interpersonal distance and interpersonal angle with the target person 2 (step S115).

Then, the movement control unit 10c executes a movement control command to move to the movement position with respect to the moving unit 13 (step S118). Specifically, the movement control unit 10c outputs the moving direction and moving distance to the calculated movement position to the moving unit 13 and executes a movement command. In this way, the mobile body 1a may move to an appropriate distance and angle in accordance with the emotion of the target person 2 and perform communication with the target person 2 without causing the target person 2 psychological stress.

Then, Steps S103 to S118 are repeated until a predetermined end condition (for example, reception of an end command by voice or gesture, a time limit, an end instruction, etc.) is satisfied (step S121).

An example of a movement control process according to the present embodiment has been described above. However, the present embodiment is not limited thereto, and for example, in the case of a configuration in which the emotion estimating unit 10a of the mobile body 1a is in a predetermined server on a cloud (cloud type mobile body control system), an operation process illustrated in FIG. 5 may be performed.

Figure 5:
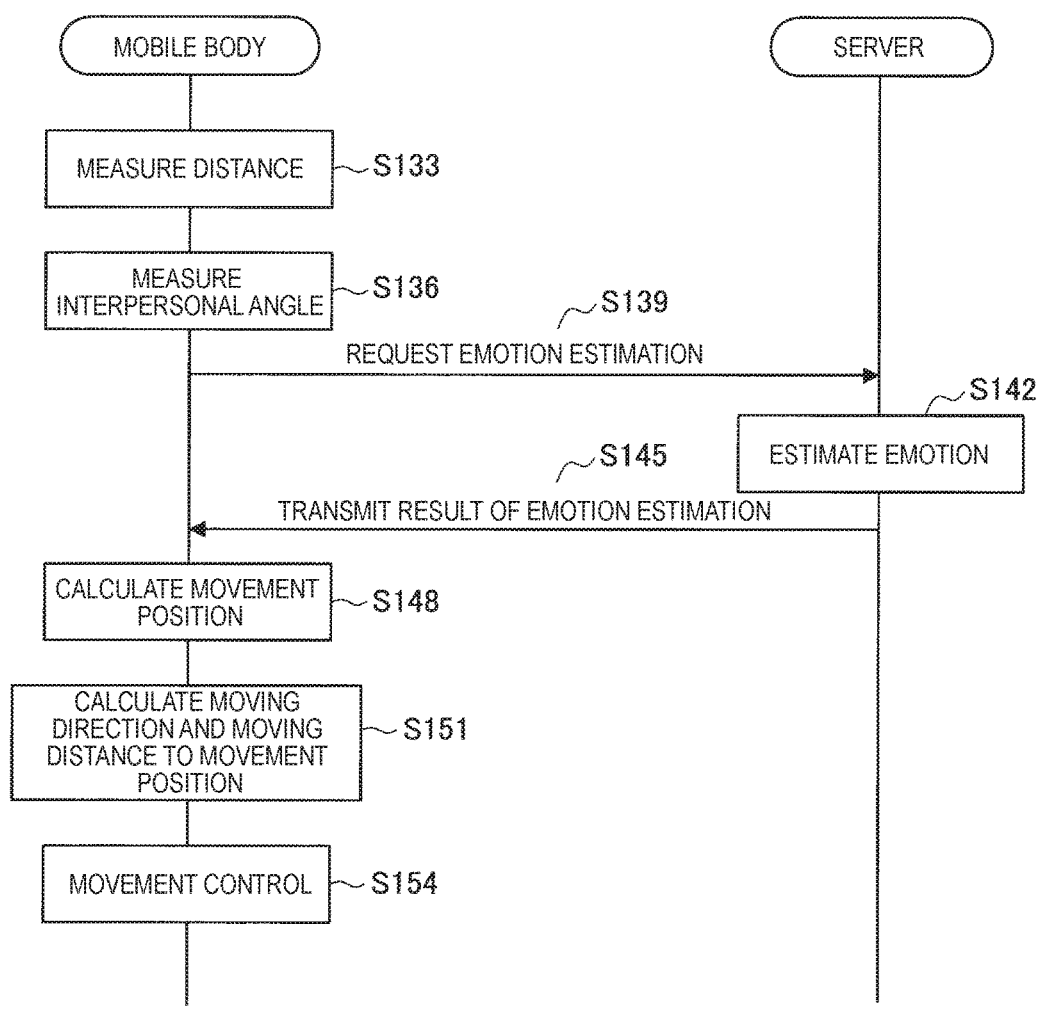
FIG. 5 is a sequence diagram illustrating another movement control process according to the first embodiment.

FIG. 5 is a sequence diagram illustrating another movement control process according to the first embodiment. As illustrated in FIG. 5, first, the distance and angle measuring unit 12 of the mobile body 1a measures a distance between the mobile body 1a and the target person 2 (step S133). Further, the distance and angle measuring unit 12 measures an interpersonal angle of the mobile body 1a with respect to the target person 2 (step S136). Steps S133 and S136 may be performed at substantially the same time.

Then, the mobile body 1a requests emotion estimation processing of the target person 2 from a server on a cloud (step S139). Here, the mobile body 1a transmits data, such as the captured image or collected voice of the target person 2, used in the emotion estimation processing to the server.

Next, the server analyzes the captured image or collected voice of the target person 2 in response to the request from the mobile body 1a and estimates an emotion of the target person 2 (step S142). Then, the server transmits a result of the estimation to the mobile body 1a (step S145).

Then, the movement position calculating unit 10b of the mobile body 1a calculates a movement position with reference to the interpersonal position knowledge DB 18 on the basis of the emotion of the target person 2 estimated by the server and the current interpersonal distance and interpersonal angle (step S148).

Then, the movement control unit 10c calculates a moving direction and a moving distance to the calculated movement position on the basis of the current interpersonal distance and interpersonal angle with the target person 2 (step S151).

Then, with respect to the moving unit 13, the movement control unit 10c executes a movement control command to move to the movement position (step S154). Specifically, the movement control unit 10c outputs the moving direction and moving distance to the calculated movement position to the moving unit 13 and executes a movement command. In this way, the mobile body 1a may move to an appropriate distance and angle in accordance with the emotion of the target person 2 and perform communication with the target person 2 without causing the target person 2 psychological stress.

The above-described process from steps S133 to S154 is repeated until a predetermined end condition (for example, reception of an end command by voice or gesture, a time limit, an end instruction, etc.) is satisfied.

(2-1-3. Example of Controlling Movement)

With respect to appropriate movement control of the mobile body 1a corresponding to an emotion of the target person 2 according to the present embodiment described above, a plurality of detailed examples of controlling movement will be described below.

EXAMPLE 1

Movement to Initial Position

Figure 6:
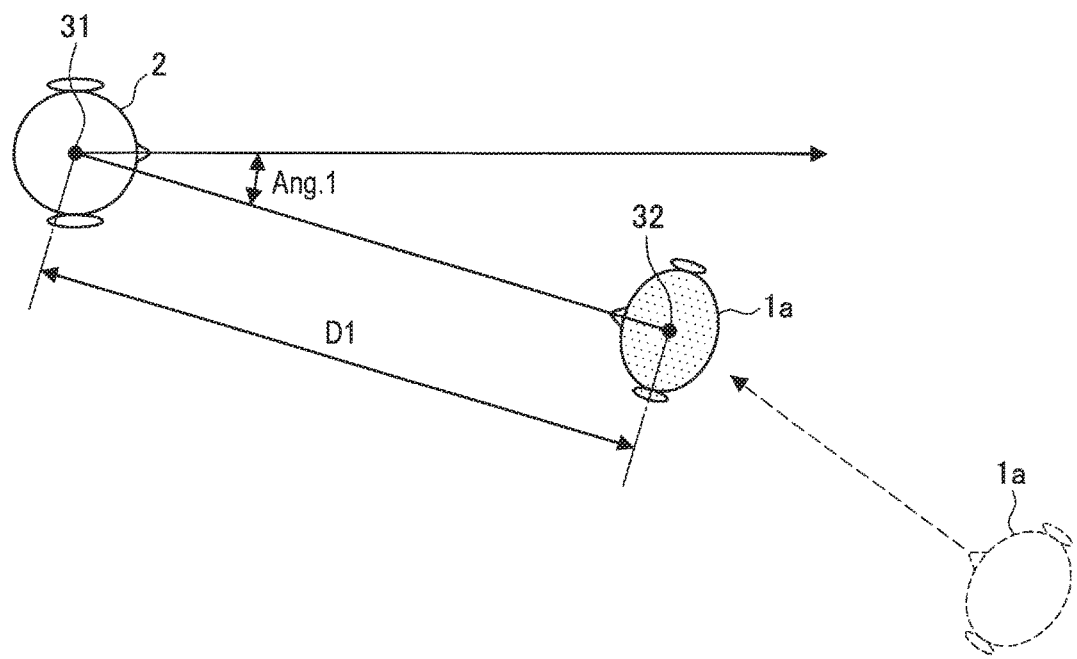
FIG. 6 is a view for describing an example of controlling movement of the mobile body at the start of communication according to the first embodiment.

FIG. 6 is a view for describing an example of controlling movement of the mobile body 1a at the start of communication according to the first embodiment. As illustrated in FIG. 6, first, at the start of communication, the mobile body 1a moves from face-to-face with a default interpersonal angle Ang.1 (for example, about 10°) with respect to a position 31 of the target person 2 to an initial position 32 of an interpersonal distance D1 (the remote phase of the individual distance: for example, about 1 m). The default interpersonal angle and the interpersonal distance may be stored in the interpersonal position knowledge DB 18. Also, when moving to the initial position, the mobile body 1a may adjust an interpersonal angle and an interpersonal distance within a predetermined range in accordance with an emotion (positive or negative) of the target person 2.

EXAMPLE 2-1

In Case in which Target Person has Positive Emotion

Next, control to a subsequent movement position of the mobile body 1a based on an emotion of the target person 2 when the mobile body 1a is moved to the initial position 32 will be described with reference to FIG. 7. FIG. 7 is a view for describing movement control of the mobile body 1a in a case in which the target person 2 has a positive emotion according to the first embodiment.

In a case in which the emotion of the target person 2 is a positive emotion (for example, the target person 2 is smiling) when the mobile body 1a is moved to the initial position 32 at the start of communication, as illustrated in the upper part of FIG. 7, the mobile body 1a moves to a first proximate position 33 closer to the target person 2 than the initial position 32 with an interpersonal distance D2 (the proximate phase of the individual distance: for example, about 50 cm) as the limit. Here, by maintaining the appropriate interpersonal angle Ang.1 with the target person 2, the mobile body 1a approaches the target person 2 without causing them stress.

Then, in a case in which the emotion of the target person 2 is a positive emotion (for example, the target person 2 is smiling) when the mobile body 1a is moved to the first proximate position 33, as illustrated in the lower part of FIG. 7, the mobile body 1a moves to a second proximate position 34, that is closer to the target person 2 than the first proximate position 33 and becomes side-by-side with the target person 2 by changing an angle, with an interpersonal distance D3 (the remote phase of the close distance: for example, about 30 cm) as a limit. When the mobile body 1a is arranged side-by-side with the target person 2, the angle of the mobile body 1a becomes an interpersonal angle Ang.2 close to about 90° with respect to the forward vector (forward direction) of the target person 2. In this way, the mobile body 1a is side-by-side with the target person 2 and faces substantially the same direction as the target person 2, thereby increasing familiarity.

EXAMPLE 2-2

Movement Stop Control

Figure 8:
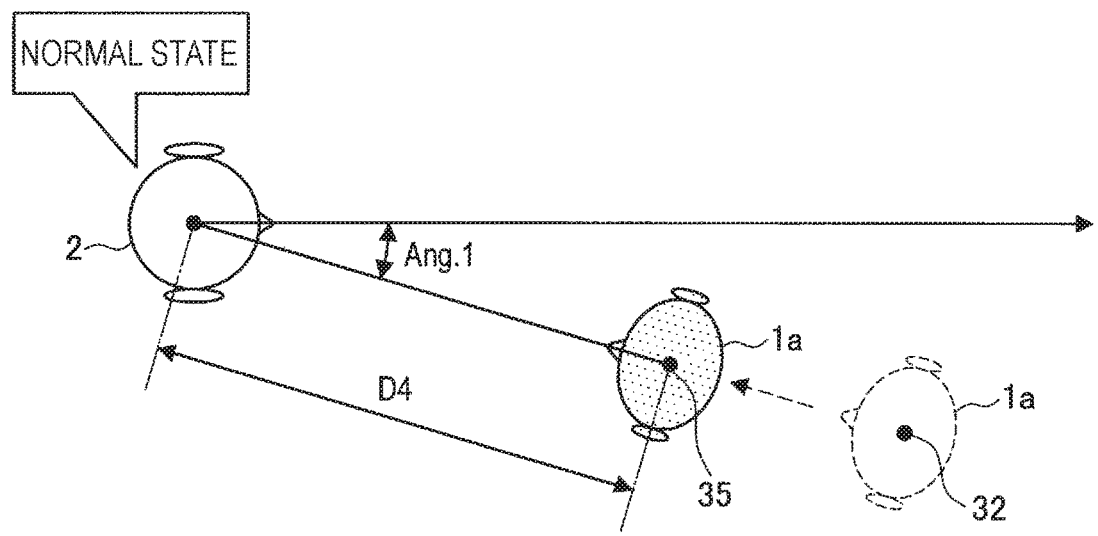
FIG. 8 is a view for describing movement stop control of the mobile body in a case in which the target person is in a normal state according to the first embodiment.

Further, for example, the mobile body 1a may continuously estimate an emotion of the target person 2 when moving from the initial position to the first proximate position 33 without changing an angle as illustrated in the upper part of FIG. 7, and may stop moving when the emotion of the target person 2 changes from smiling to a normal state as illustrated in FIG. 8. In the example illustrated in FIG. 8, because the target person 2 is no longer smiling and is in the normal state at the point at which the mobile body 1a is moved to a position 35 of an interpersonal distance D4 (D4>D2) from the target person 2, the mobile body 1a stops moving in order to avoid causing the target person 2 psychological stress.

The mobile body 1a may also perform movement stop control in accordance with a predetermined interaction (that is, behavior) of the target person 2 when approaching the target person 2. FIG. 9 is a view for describing another type of movement stop control of the mobile body according to the present embodiment. As illustrated in the upper part of FIG. 9, for example, in a case in which the target person 2 backs away from the mobile body 1a when the mobile body 1a approaches the target person 2, the mobile body 1a stops moving so as not to narrow the interpersonal distance. Also, as illustrated in the lower part of FIG. 9, for example, in a case in which the target person 2 looks away (diverts his or her gaze) when the mobile body 1a approaches the target person 2 while face-to-face with the target person 2, the mobile body 1a stops moving so as not to narrow the interpersonal distance. Because the interactions, "backing away" and "looking away," of the target person 2 described with reference to FIG. 9 are both behaviors indicating that the target person 2 may have a negative emotion, the mobile body 1a stops moving so as not to cause the target person 2 psychological stress.

EXAMPLE 2-3

When Target Person has Negative Emotion)

Figure 10:
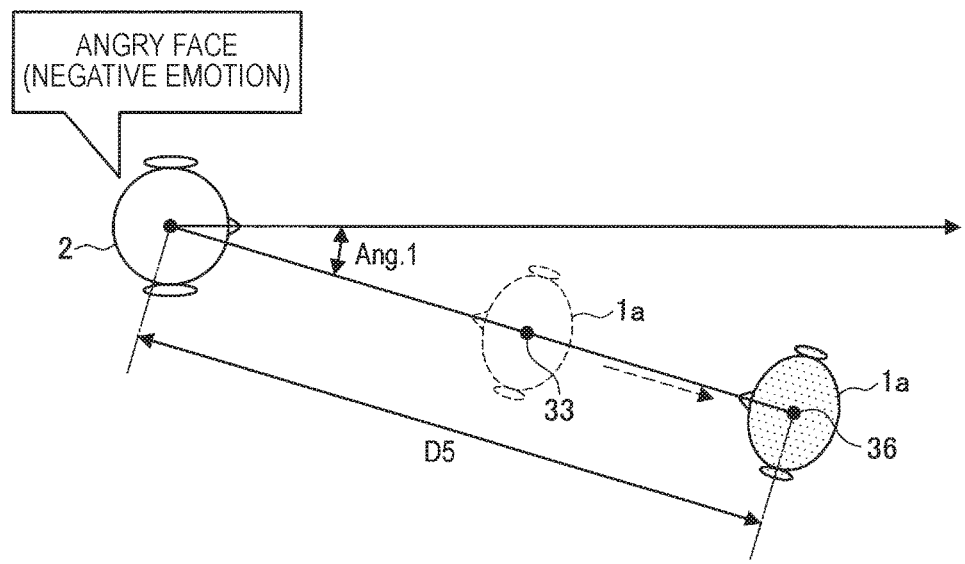
FIG. 10 is a view for describing movement control of the mobile body in a case in which the target person has a negative emotion according to the first embodiment.
Figure 11:
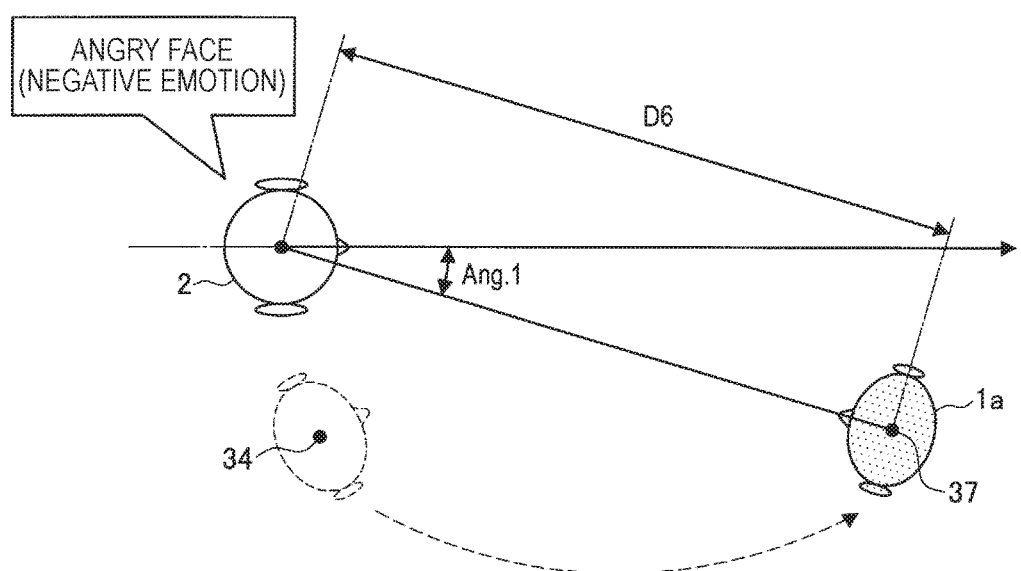
FIG. 11 is a view for describing movement control of the mobile body in a case in which the target person has a negative emotion according to the first embodiment.

Next, movement control of the mobile body 1a in a case in which the target person 2 has a negative emotion when the mobile body 1a is moved to the first proximate position 33 or the second proximate position 34 (see FIG. 7) will be described with reference to FIGS. 10 and 11. FIGS. 10 and 11 are views for describing movement control of the mobile body 1a in a case in which the target person 2 has a negative emotion according to the first embodiment.

For example, in a case in which the emotion of the target person 2 is a negative emotion (for example, an angry face) when the mobile body 1a is moved from the initial position 32 to the first proximate position 33 (see the upper part of FIG. 7), as illustrated in FIG. 10, the mobile body 1a backs away from the target person 2 and moves to a first remote position 36 with an interpersonal distance D5 (the remote phase: for example, about 1 m) as a limit. Here, the mobile body 1a moves backward while maintaining the appropriate interpersonal angle Ang.1 with the target person 2. In this way, the mobile body 1a can avoid being too close to the target person 2 and causing the target person 2 stress.

Further, in a case in which the emotion of the target person 2 is a negative emotion (for example, an angry face) when the mobile body 1a is moved from the first proximate position 33 to the second proximate position 34 and is side-by-side with the target person 2 (see the lower part of FIG. 7), as illustrated in FIG. 11, the mobile body 1a backs away from the target person 2 and moves to a second remote position 37 with an interpersonal distance D6 (the remote phase: for example, about 1 m) as a limit. Here, although the mobile body 1a has assumed the angle Ang.2 (see the lower part of FIG. 7) for increasing familiarity with the target person 2 at the second proximate position 34, the mobile body 1a changes the direction to a direction substantially facing the target person 2 and moves backward while maintaining the appropriate angle Ang.1 so as not to cause the target person 2 stress. In this way, the mobile body 1a can avoid being too close to the target person 2 and causing the target person 2 stress.

EXAMPLE 3

In Case of Mobile Body that is Vertically Movable)

When the mobile body 1a has a propeller and the like and can fly, because the mobile body 1a can move in a vertical direction, the mobile body 1a can increase familiarity with the target person 2 or avoid causing the target person 2 stress by adjusting the height of the mobile body 1a in accordance with a gaze of the target person 2. Hereinafter, this will be described in detail with reference to FIG. 12.

Figure 12:
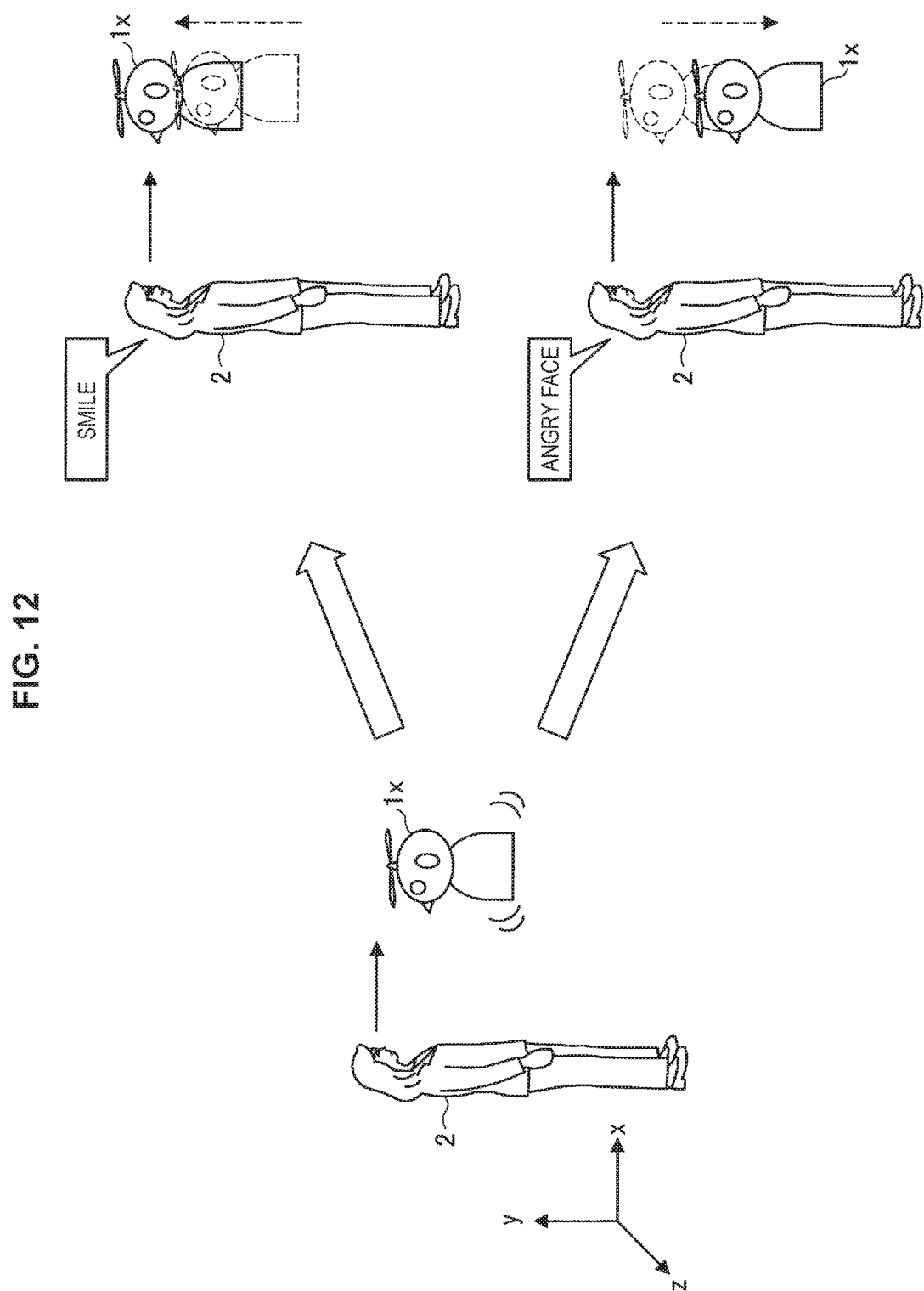
FIG. 12 is a view for describing vertical movement control of a mobile body according to modified example of the first embodiment.

FIG. 12 is a view for describing vertical movement control of a mobile body 1x according to modified example of the first embodiment. The mobile body 1x is realized using, for example, a robot that includes a propeller and the like and can fly. Generally, because being at a higher position than a gaze of a partner gives a sense of intimidation to the partner, as illustrated on the left in FIG. 12, the mobile body 1x moves to a position that is slightly lower than a gaze of a partner and is in the vicinity of the partner as an initial position. Here, the interpersonal distance and the interpersonal angle (xz position) are the appropriate interpersonal distance D1 and interpersonal angle Ang.1 as in the case illustrated in FIG. 6.

Then, in a case in which the emotion of the target person 2 is positive (for example, a smile) when the mobile body 1x is at the initial position, the mobile body 1x moves upward and reaches a height equal to that of the gaze of the target person 2 as illustrated in the upper right part of FIG. 12, thereby increasing familiarity with the target person 2.

In a case in which the emotion of the target person 2 is negative (for example, angry face) when the mobile body 1x is at the initial position, the mobile body 1x moves downward and becomes lower than the gaze of the target person 2 as illustrated in the lower right part of FIG. 12, thereby reducing stress to the target person 2.

The above-described vertical movement control in the height direction of the mobile body 1x is not limited to the case of the initial position and may also be similarly performed in accordance with an emotion of the target person 2 when the mobile body 1x is at the first and second proximate positions or the first and second remote positions. For example, the mobile body 1x is side-by-side with the height that is equal to the height of the eye of the target person 2 when at the second proximate position 34 (see the lower part of FIG. 7) and is at a position diagonally lower than the height of the eye of the target person 2 when at the first remote position 36 (see FIG. 10).

EXAMPLE 4

Responding by Changing Direction of Mobile Body 1a

Although control in which only the interpersonal distance of the mobile body 1a or the interpersonal distance and the interpersonal angle are changed in accordance with an emotion of the target person 2 has been described in the above-described movement control examples, the present embodiment is not limited thereto, and for example, only the interpersonal angle of the mobile body 1a may be changed. Hereinafter, an example will be described with reference to FIGS. 13 and 14.

Figure 13:
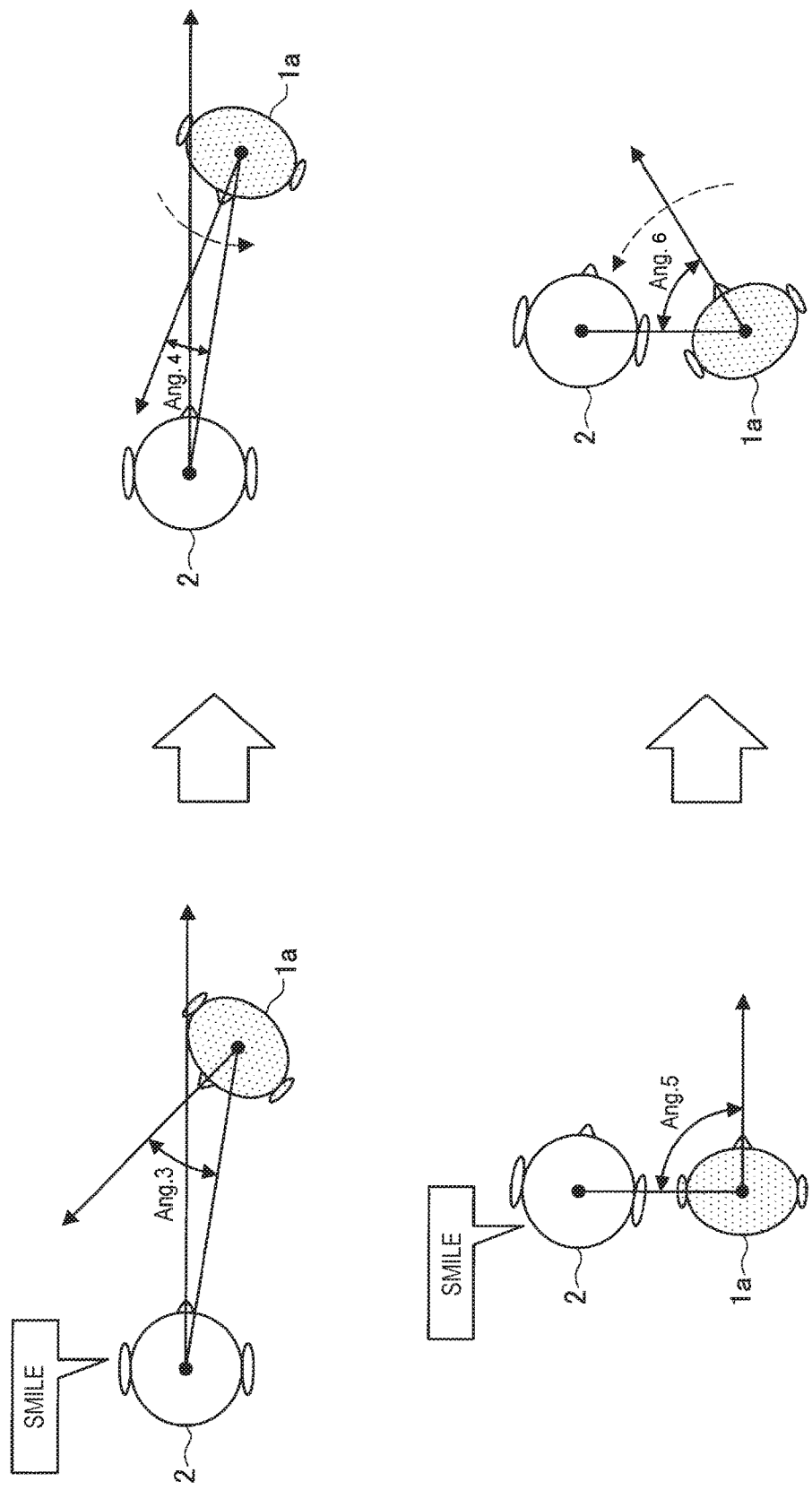
FIG. 13 is a view for describing change of an interpersonal angle of the mobile body in the case in which the target person has a positive emotion according to the first embodiment.

FIG. 13 is a view for describing change of an interpersonal angle of the mobile body 1a in the case in which the target person 2 has a positive emotion according to the first embodiment. For example, in a case in which the target person 2 smiles when the mobile body 1a is face-to-face with the target person 2 at an interpersonal angle Ang.3 as illustrated in the upper part of FIG. 13, the mobile body 1a changes a direction to reduce the absolute value of the interpersonal angle, for example, faces the target person 2 at an interpersonal angle Ang.4 (Ang.4<Ang.3), thereby further increasing familiarity with the target person 2.

In a case in which the target person 2 smiles when the mobile body 1a is side-by-side with the target person 2 at an interpersonal angle Ang.5 as illustrated in the lower part of FIG. 13, the mobile body 1a changes the direction to reduce the absolute value of the interpersonal angle, for example, faces the direction of the target person 2 at an interpersonal angle Ang.6 (Ang.6<Ang.5), thereby further increasing familiarity with the target person 2.

Figure 14:
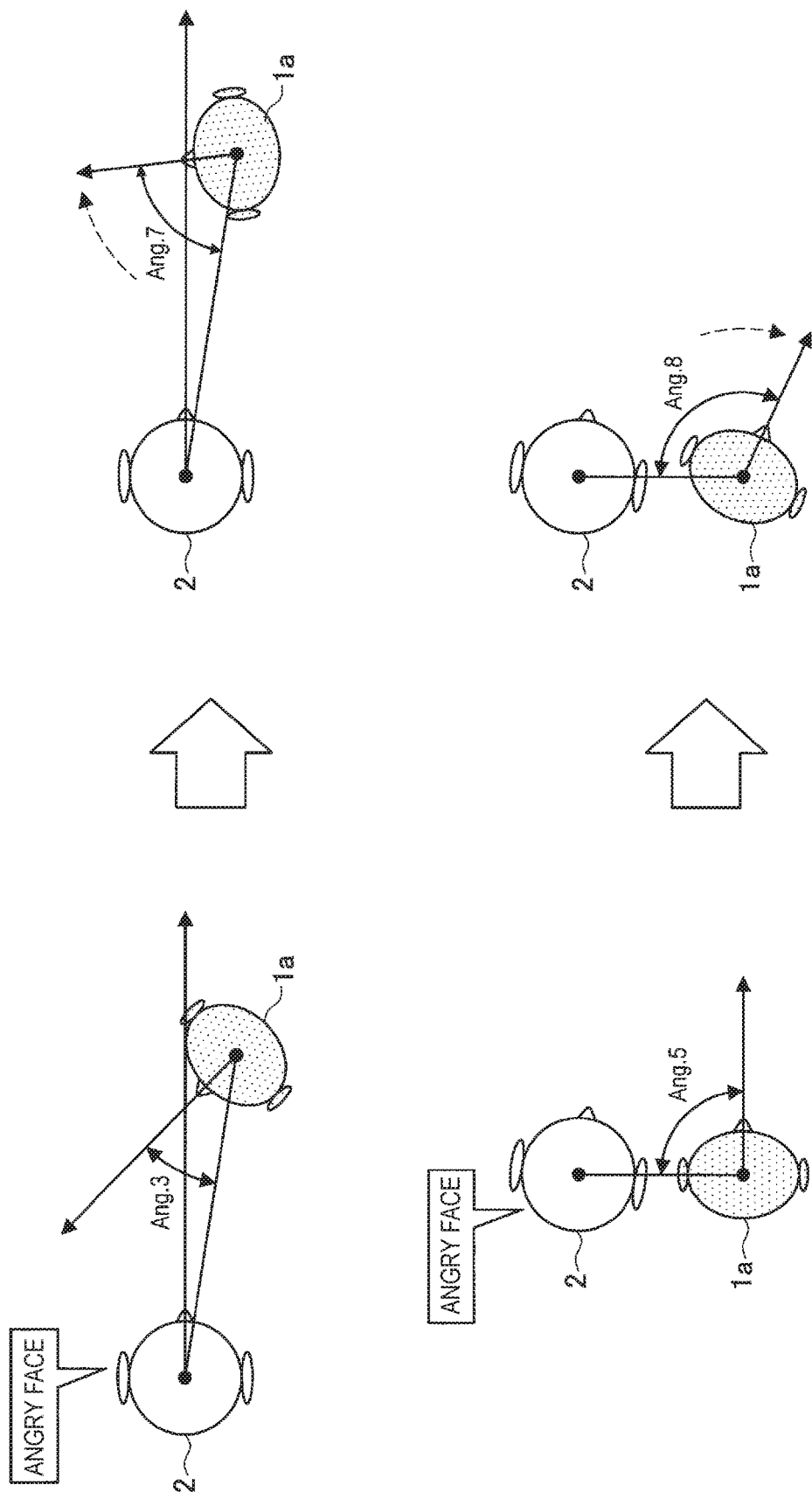
FIG. 14 is a view for describing change of an interpersonal angle of the mobile body in the case in which the target person has a negative emotion according to the first embodiment.

FIG. 14 is a view for describing change of an interpersonal angle of the mobile body 1a in the case in which the target person 2 has a negative emotion according to the first embodiment. For example, in a case in which the target person 2 has an angry face when the mobile body 1a is face-to-face with the target person 2 at the interpersonal angle Ang.3 as illustrated in the upper part of FIG. 14, the mobile body 1a changes a direction to increase the absolute value of the interpersonal angle, for example, faces the target person 2 at an interpersonal angle Ang.7 (Ang.7>Ang.3), thereby not causing the target person 2 psychological stress.

In a case in which the target person 2 has an angry face when the mobile body 1a is side-by-side with the target person 2 at the interpersonal angle Ang.5 as illustrated in the lower part of FIG. 14, the mobile body 1a changes the direction to increase the absolute value of the interpersonal angle, for example, diverts its gaze from the target person 2 to an interpersonal angle Ang.8 (Ang.8>Ang.5), thereby not causing the target person 2 psychological stress.

<2-2. Second Embodiment>

Next, a mobile body control system according to a second embodiment of the present disclosure will be described with reference to FIGS. 15 to 20. In the second embodiment, a mobile body 1b moves to a more appropriate position using history information when communicating in the past with the communication target person 2, thereby communicating with the target person 2 without causing the target person 2 unnecessary stress.

(2-2-1. Configuration)

Figure 15:
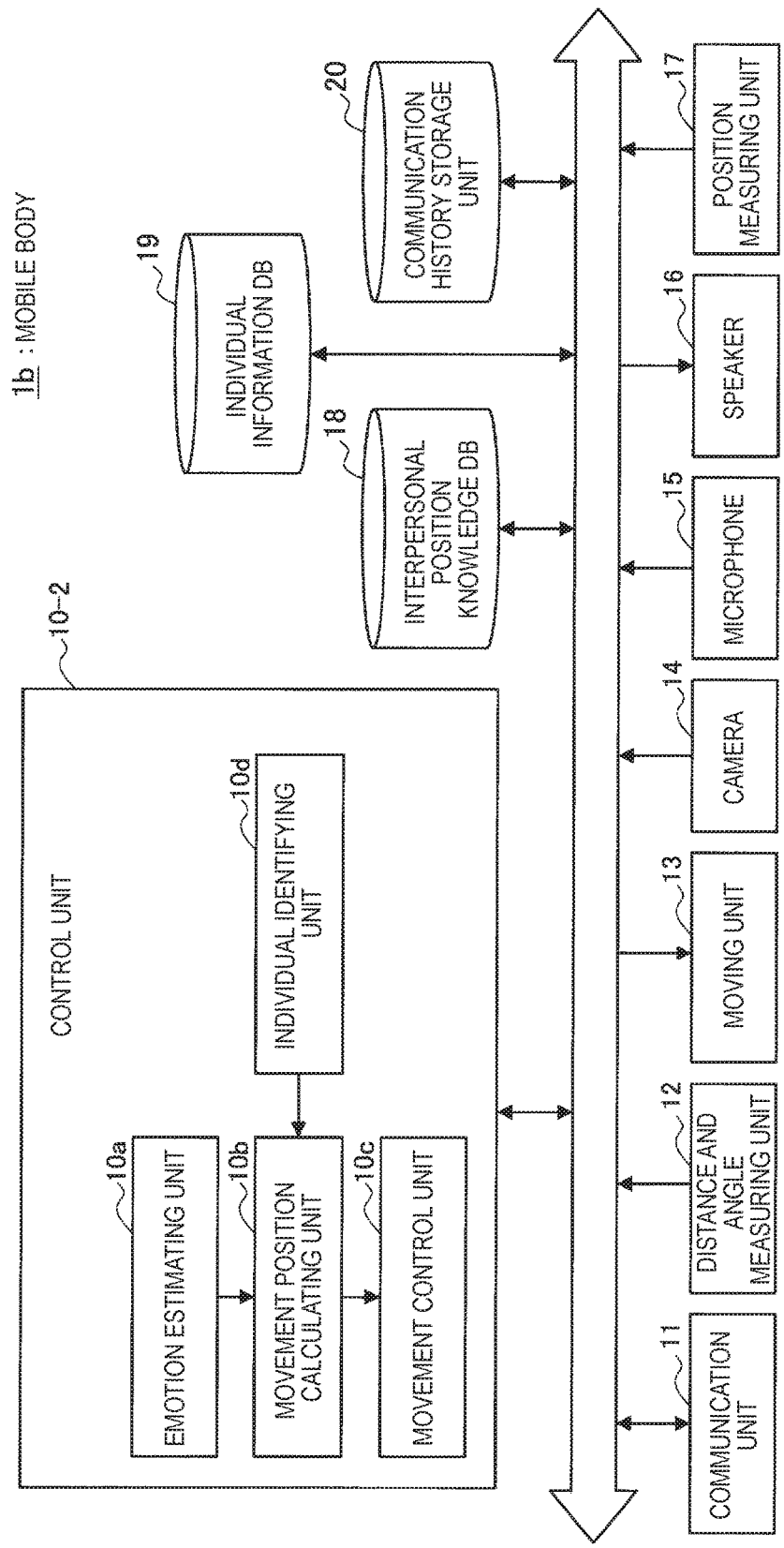
FIG. 15 is a block diagram illustrating an example of a configuration of a mobile body according to a second embodiment.

FIG. 15 is a block diagram illustrating an example of a configuration of the mobile body 1b according to the second embodiment. As illustrated in FIG. 15, the mobile body 1b according to the present embodiment includes a control unit 10-2, the communication unit 11, the distance and angle measuring unit 12, the moving unit 13, the camera 14, the microphone 15, the speaker 16, the position measuring unit 17, the interpersonal position knowledge DB 18, an individual information DB 19, and a communication history storage unit 20.

The control unit 10-2 is configured by a microcomputer having a CPU, a ROM, a RAM, and a nonvolatile memory and controls each configuration of the mobile body 1b. Further, as illustrated in FIG. 15, the control unit 10-2 functions as the emotion estimating unit 10a, the movement position calculating unit 10b, the movement control unit 10c, and an individual identifying unit 10d.

The individual identifying unit 10d performs individual identification of the communication partner (the target person 2 in the present embodiment). For example, the individual identifying unit 10d acquires an individual ID of the target person 2 with reference to the individual information DB 19 on the basis of a facial recognition result of a captured image of the target person 2 captured by the camera 14. Here, parameters, such as facial feature amounts or voice feature amounts of the communication partner, used for individual identification and information on individuals (for example, an individual ID, name, age, sex, hobby and preference, etc.) are stored in the individual information DB 19.

The movement position calculating unit 10b calculates an appropriate movement position on the basis of the current emotion of the target person 2 estimated by the emotion estimating unit 10a and a communication history of the target person 2 acquired from the communication history storage unit 20 in accordance with the individual ID of the target person 2 identified by the individual identifying unit 10d. Here, a data structure stored in the communication history storage unit 20 includes a time stamp, a target 1 (the target Ta illustrated in FIG. 2), a target 2 (the target Tb illustrated in FIG. 2), a distance (distance between the target 1 and the target 2: Xab), an angle 1 (Ang.a illustrated in FIG. 2), an angle 2 (Ang.b illustrated in FIG. 2), an emotion 1 (emotion of the target Ta), and an emotion 2 (emotion of the target Tb). For example, the time stamp is expressed as a UNIX (registered trademark) time, the target is expressed as a hexadecimal ID, the distance is expressed as centimeters, the angle is expressed as degrees, and the emotion is expressed as a value of valence and arousal normalized to "−1 to 1." An example of data in the communication history storage unit 20 is shown in Table 1 below.

TABLE 1

| Timestamp | Target 1 | Target 2 | Distance | Angle 1 | Angle 2 | Emotion 1 | Emotion 2 |
|---|---|---|---|---|---|---|---|
| 1421879415 | C717EB3C | 4E14D94C | 128.6 | 23.7 | 7.6 | 0.7, 0.2 | −0.4, 0.1 |
| ... | ... | ... | ... | ... | ... | ... | ... |
| 1421877811 | 065B6107 | 8E6A8451 | 201.4 | 87.4 | −92.5 | 0.3, 0.4 | −0.1, −0.3 |
| ... | ... | ... | ... | ... | ... | ... | ... |

In the present embodiment, more specifically, a time stamp, an ID of the target person 2, an ID of the mobile body 1*b*, a distance (an interpersonal distance between the target person 2 and the mobile body 1*b*), and an angle (an interpersonal angle between the target person 2 and the mobile body 1*b*) are stored in the communication history storage unit 20. The movement position calculating unit 10*b* acquires matching data or average value data of a plurality of matching data from the communication history storage unit 20 on the basis of the individual ID of the target person 2 and the individual ID of the mobile body 1*b* and uses the acquired data in calculating the movement position.

When history information of the target person 2 is not obtained from the communication history storage unit 20, the movement position calculating unit 10*b* may also calculate an appropriate position and an interpersonal angle corresponding to the current interpersonal distance and interpersonal angle with the target person 2 and emotion of the target person 2 with reference to the interpersonal position knowledge DB 18.

The configuration of the mobile body 1*b* according to the present embodiment has been described above in detail. Here, description of the same configuration as the mobile body 1*a* according to the first embodiment described with reference to FIG. 3 will be omitted. The configuration of the mobile body 1*b* according to the second embodiment is not limited to the configuration illustrated in FIG. 15, and for example, at least one of the emotion estimating unit 10*a*, the individual identifying unit 10*d*, the individual information DB 19, and the communication history storage unit 20 may be present on a cloud.

(2-2-2. Operation)

Figure 16:
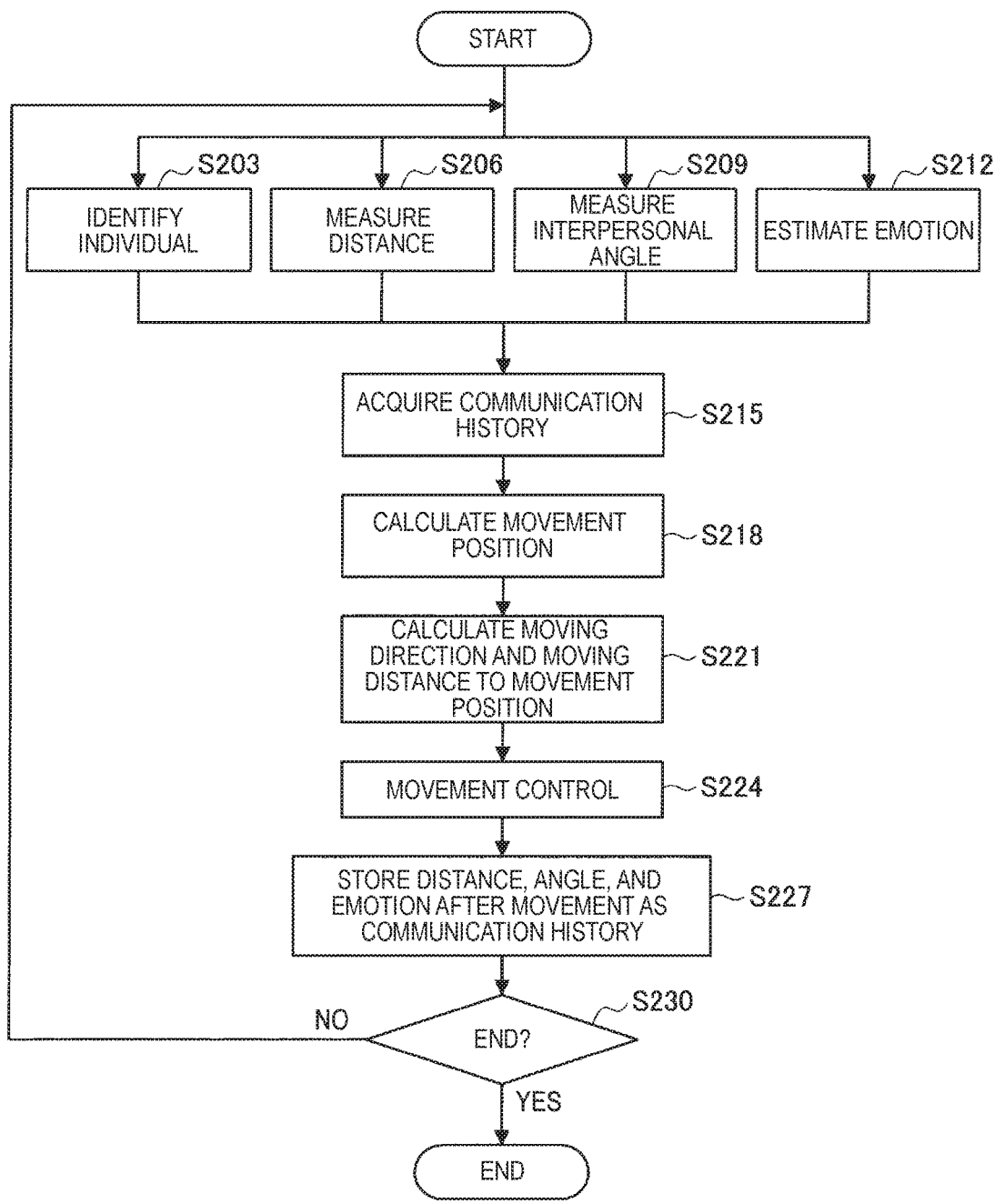
FIG. 16 is a flowchart illustrating a movement control process according to the second embodiment.

Next, an operation process of the mobile body control system according to the second embodiment will be described with reference to FIG. 16. FIG. 16 is a flowchart illustrating a movement control process according to the second embodiment. As illustrated in FIG. 16, first, the control unit 10-2 of the mobile body 1*b* performs individual identification of the communication target (the target person 2) by the individual identifying unit 10*d* (step S203). Also, the control unit 10-2 measures an interpersonal distance with the target person 2 by the distance and angle measuring unit 12 (step S206), measures an interpersonal angle (step S209), and estimates emotion of the target person 2 by the emotion estimating unit 10*a* (step S212). Steps S203 to S212 may be performed substantially at the same time.

Then, the movement position calculating unit 10*b* of the mobile body 1*b* acquires a communication history between the target person 2 and the mobile body 1*b* from the communication history storage unit 20 on the basis of the identified individual ID of the target person 2 (step S215).

Then, the movement position calculating unit 10*b* calculates a movement position on the basis of the acquired communication history (step S218). For example, at the start of communication, the movement position calculating unit 10*b* calculates an initial position on the basis of the acquired communication history with the target person 2. In a case in which emotion of the target person 2 is positive when the mobile body 1*b* is at the initial position, the movement position calculating unit 10*b* determines whether the mobile body 1*b* further approaches the target person 2 on the basis of the communication history with the target person 2. For example, in a case in which emotion of the target person 2 when the mobile body 1*b* was closer to the target person 2 than the current interpersonal distance was positive based on the communication history of the past, the movement position calculating unit 10*b* calculates a position closer to the target person 2 than the current position as the movement position.

Then, on the basis of the current interpersonal distance and interpersonal angle with the target person 2, the movement control unit 10*c* calculates a moving direction and a moving distance to the movement position calculated by the movement position calculating unit 10*b* in step S218 (step S221).

Then, with respect to the moving unit 13, the movement control unit 10*c* executes a movement control command to move to the movement position (step S224).

Then, the control unit 10-2 controls an interpersonal distance, an interpersonal angle, and emotion of the target person 2 after the movement to be stored in the communication history storage unit 20 as a communication history together with a time stamp (step S227).

Then, steps S203 to S227 are repeated until a predetermined end condition (for example, reception of an end command by voice or gesture, time limit, end instruction, etc.) is satisfied (step S230).

An example of a movement control process according to the present embodiment has been described above. However, the present embodiment is not limited thereto, and for example, in a case of a configuration in which each of the emotion estimating unit 10*a*, the individual identifying unit 10*d*, and the interpersonal position knowledge DB 18 of the mobile body 1*b* is present in a predetermined server on a cloud (cloud type mobile body control system), an operation process illustrated in FIG. 17 may be performed.

Figure 17:
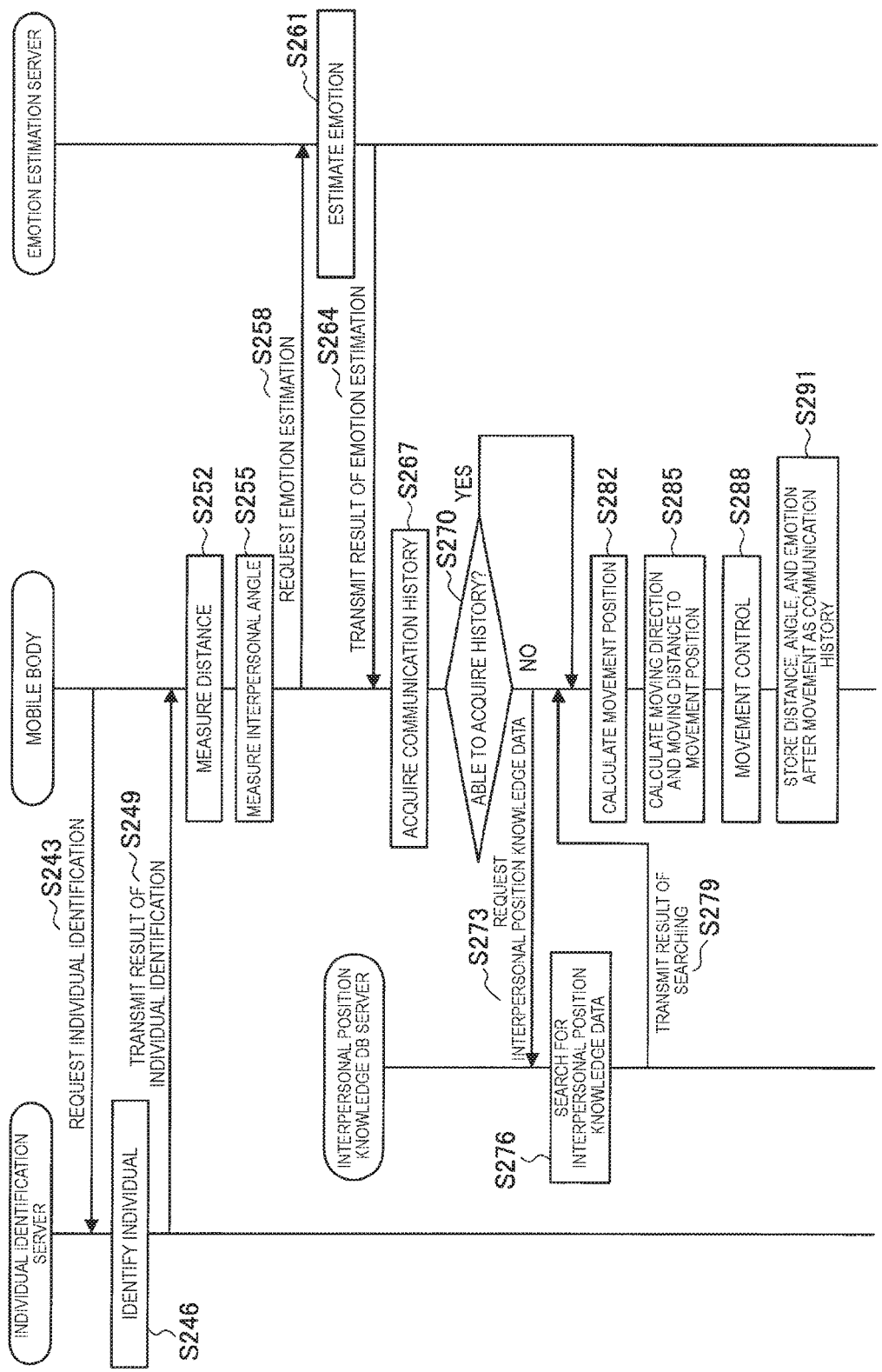
FIG. 17 is a sequence diagram illustrating another movement control process according to the second embodiment.

FIG. 17 is a sequence diagram illustrating another movement control process according to the second embodiment. As illustrated in FIG. 17, first, the control unit 10-2 of the mobile body 1*b* requests an individual identification server on a cloud for individual identification (step S243). Here, the mobile body 1*b* transmits data, such as the captured image or collected voice of the target person 2, used in the individual identification processing to the individual identification server.

Next, the individual identification server analyzes the captured image or collected voice of the target person 2 in response to the request from the mobile body 1*b* and performs individual identification (step S246). Then, the individual identification server transmits a result of the identification to the mobile body 1*b* (step S249).

Then, by the distance and angle measuring unit 12, the mobile body 1*b* measures an interpersonal distance between the mobile body 1*b* and the target person 2 (step S252) and measures the interpersonal angle (step S255). Steps S252 and S255 may be performed substantially at the same time.

Then, the mobile body 1*b* requests an emotion estimation server on the cloud for emotion estimation processing of the target person 2 (step S258). Here, the mobile body 1*b* transmits data, such as the captured image or collected voice of the target person 2, used in the emotion estimation processing to the server.

Next, the emotion estimation server analyzes the captured image or collected voice of the target person 2 in response to the request from the mobile body 1*b* and estimates emotion of the target person 2 (step S261). Then, the emotion estimation server transmits a result of the estimation to the mobile body 1*b* (step S264).

Then, the movement position calculating unit 10*b* of the mobile body 1*b* acquires the communication history between the target person 2 and the mobile body 1*b* from the communication history storage unit 20 on the basis of the individual ID of the target person 2 identified by the individual identification server (step S267).

Then, in a case in which the communication history of the target person 2 cannot be acquired (step S270/No), the mobile body 1b requests an interpersonal position knowledge DB server on the cloud for interpersonal position knowledge data (step S273).

Then, the interpersonal position knowledge DB server searches for the interpersonal position knowledge data in response to the request from the mobile body 1b (step S276) and transmits a result of the searching to the mobile body 1b (step S279).

Then, the movement position calculating unit 10b of the mobile body 1b calculates a movement position with reference to the acquired communication history or interpersonal position knowledge data on the basis of the estimated emotion of the target person 2 and the current interpersonal distance and interpersonal angle (step S282).

Then, the movement control unit 10c of the mobile body 1b calculates a moving direction and a moving distance to the calculated movement position on the basis of the current interpersonal distance and interpersonal angle with the target person 2 (step S285).

Then, with respect to the moving unit 13, the movement control unit 10c executes a movement control command to move to the movement position (step S288). In this way, when the communication history of the target person 2 can be obtained, the mobile body 1b can move to an appropriate distance and angle on the basis of the past communication with the target person 2 and can communicate with the target person 2 without causing the target person 2 psychological stress.

Then, the control unit 10-2 controls an interpersonal distance, an interpersonal angle, and emotion of the target person 2 to be stored in the communication history storage unit 20 as a communication history together with a time stamp (step S291).

The above-described process from steps S243 to S288 is repeated until a predetermined end condition (for example, reception of an end command by voice or gesture, time limit, end instruction, etc.) is satisfied.

(2-2-3. Example of Controlling Movement)

With respect to appropriate movement control of the mobile body 1b based on a communication history of the target person 2 according to the second embodiment described above, a plurality of detailed examples of controlling movement will be described below.

EXAMPLE 1

Movement to Initial Position

Figure 18:
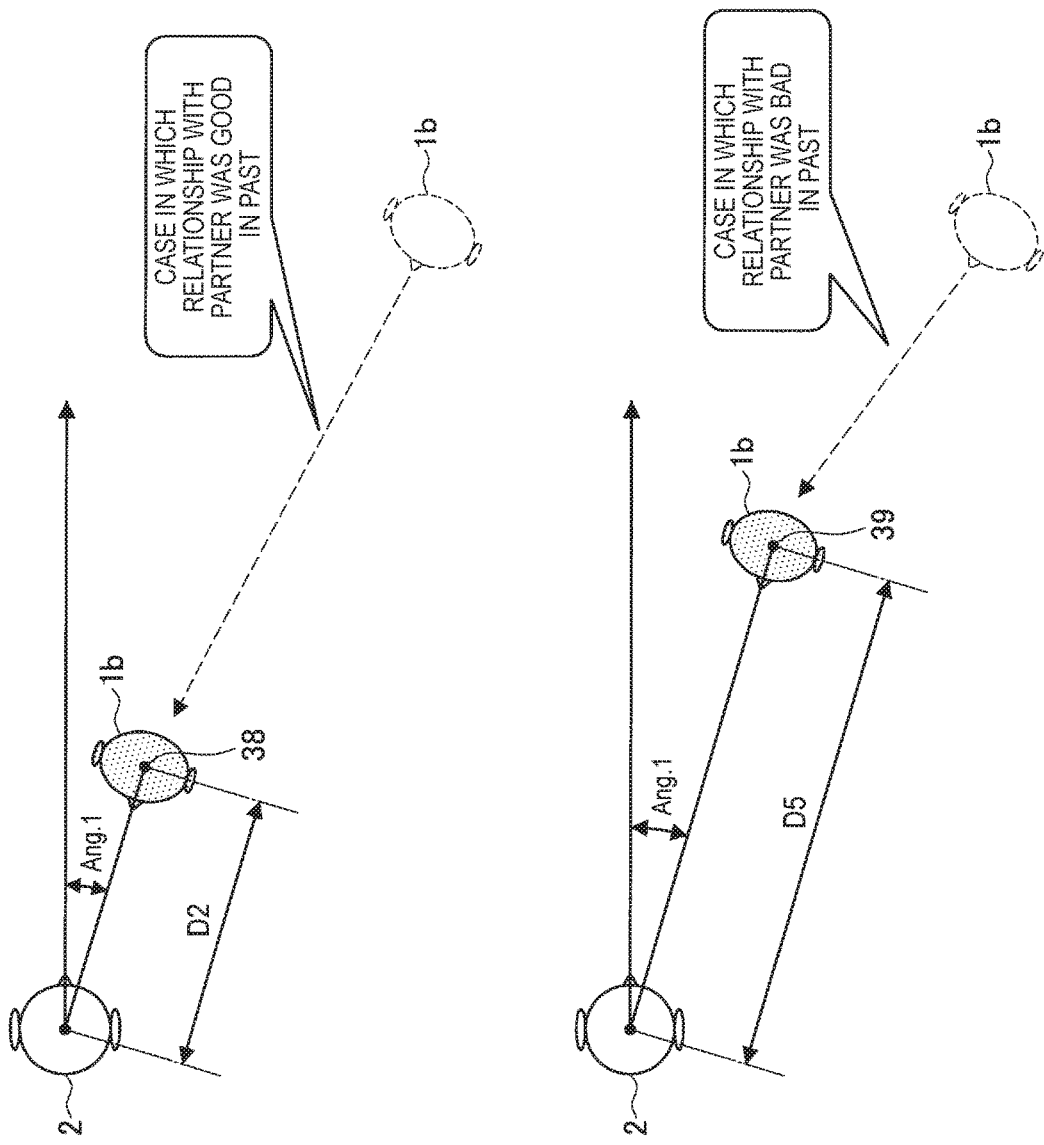
FIG. 18 is a view for describing an example of controlling movement of the mobile body at the start of communication according to the second embodiment.

FIG. 18 is a view for describing an example of controlling movement of the mobile body 1b at the start of communication according to the second embodiment. At the start of communication, the mobile body 1a calculates an appropriate initial position at which there is no stress to the partner on the basis of the communication history of the target person 2 and moves.

For example, when the mobile body 1b had a good relationship with the target person 2 (for example, a smiling face, positive emotion) in the past and takes a close distance to the target person 2 or is side-by-side with the target person 2, as illustrated in the upper part of FIG. 18, the mobile body 1b moves to an initial position 38 having the appropriate interpersonal angle Ang.1 with an interpersonal distance D7 (the proximate phase: for example, about 50 cm) close to the target person 2 as a limit. In this way, when the past communication history was good, the mobile body 1b moves from the beginning to a place close to the target person 2.

On the other hand, when the mobile body 1b had a bad relationship with the target person 2 (for example, angry face, negative emotion) in the past and takes a far distance from the target person 2, as illustrated in the lower part of FIG. 18, the mobile body 1b moves to an initial position 39 having the appropriate interpersonal angle Ang.1 with an interpersonal distance D5 (the remote phase: for example, about 1 m) far from the target person 2 as a limit. In this way, when the past communication history was bad, the mobile body 1b moves to a place far from the target person 2 at the start of communication.

EXAMPLE 2

Movement Control to Proximate Position

Next, in a case in which the target person 2 smiles (that is, has a positive emotion) when the mobile body 1b is at a movement position (for example, the initial position), the mobile body 1b performs movement control to a proximate position that is closer to the target person 2 than the current position. Here, in the present embodiment, past emotion of the target person 2 when the mobile body 1b moved to a closer distance to the target person 2 than the current interpersonal distance is acquired from the communication history storage unit 20, and whether to move to the proximate position is determined on the basis of the past situation. Hereinafter, this will be described in detail with reference to FIG. 19.

Figure 19:
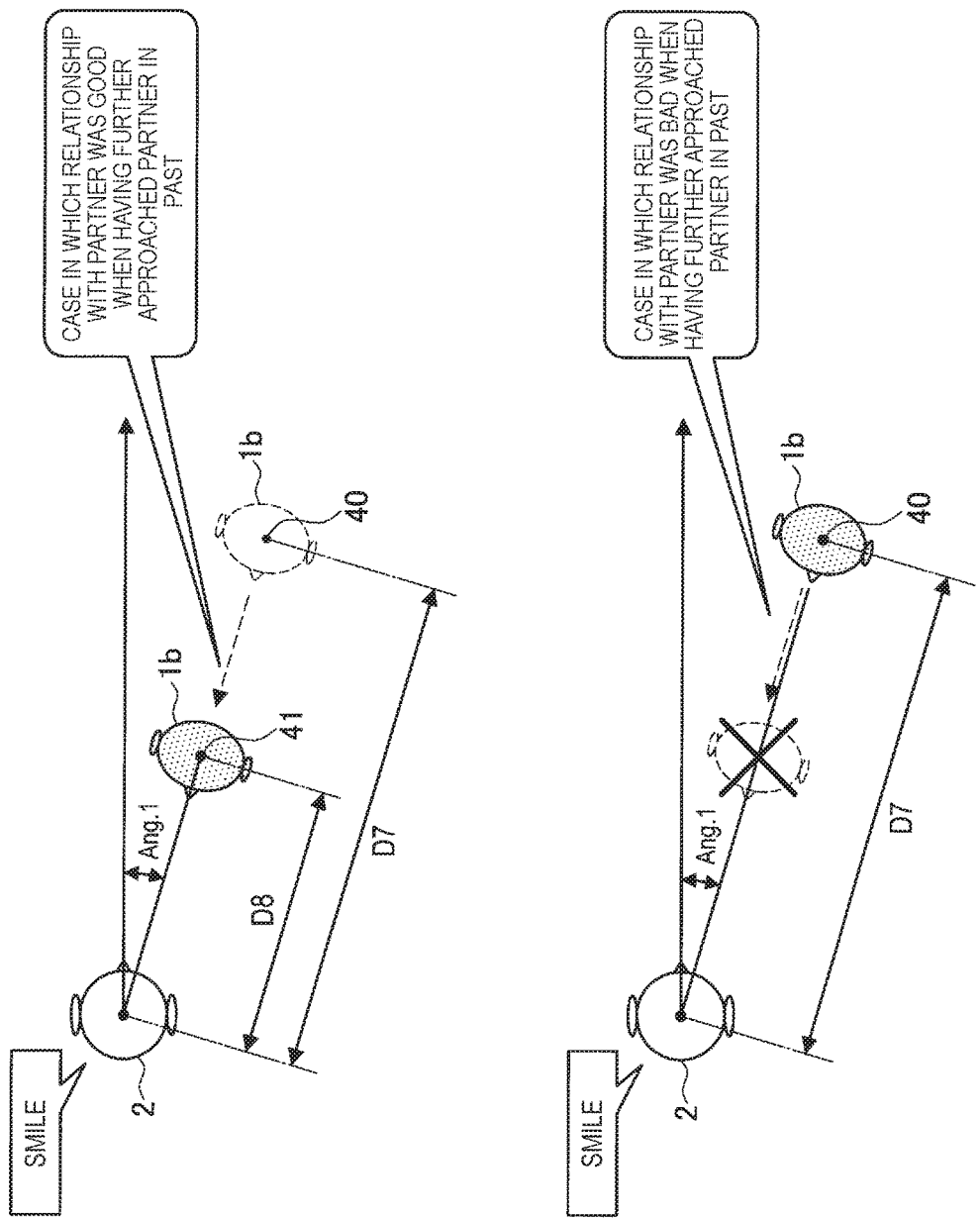
FIG. 19 is a view for describing an example of controlling movement to a proximate position based on a communication history according to the second embodiment.

For example, as illustrated in the upper part of FIG. 19, in a case in which the mobile body 1b had a good relationship with the partner when approaching the partner in the past (that is, the partner had positive emotion even when the mobile body 1b was approaching), the mobile body 1b controls to move from a current position 40 having an interpersonal distance D7 to a proximate position 41 having an interpersonal distance D8 (the proximate phase: for example, about 50 cm). Here, the interpersonal angle takes the predetermined appropriate angle Ang.1 stored in the interpersonal position knowledge DB 18 or the angle, at which the relation with the partner is good, calculated on the basis of the communication history.

As illustrated in the lower part of FIG. 19, in a case in which the mobile body 1b had a bad relationship with the partner when approaching the partner in the past (that is, the partner had negative emotion when the mobile body 1b was approaching), that mobile body 1b controls so as not to approach the target person 2 and stop at the current position 40 having the interpersonal distance D7 even when the target person 2 currently smiles (that is, has a positive emotion). Here, the interpersonal angle takes the predetermined appropriate angle Ang.1 stored in the interpersonal position knowledge DB 18 or the angle, at which the relation with the partner is good, calculated on the basis of the communication history.

As described above, when it is estimated that the current emotion of the target person 2 is positive emotion, by referring to the past communication history with the target person 2, the mobile body 1b can appropriately determine whether to further approach the target person 2 and more reliably avoid causing the target person 2 stress.

EXAMPLE 3

Movement Control to Side-by-side Position

Then, in a case in which the target person 2 smiles (that is, has a positive emotion) when the mobile body 1b is at a movement position (for example, the proximate position), the mobile body 1b performs movement control to a close position that is closer to the target person 2 than the current position and is side-by-side with the target person 2. Here, in the present embodiment, past emotion of the target person 2 when the mobile body 1b was at a closer distance (for example, a close position) from the target person 2 than the current interpersonal distance is acquired from the communication history storage unit 20, and whether to move to the proximate position is determined on the basis of the past situation. Hereinafter, this will be described in detail with reference to FIG. 20.

For example, as illustrated in the upper part of FIG. 20, in a case in which the mobile body 1b had a good relationship with the partner when the mobile body 1b approached the partner and became side-by-side with the partner in the past (that is, the partner had positive emotion), the mobile body 1b controls to move from a current position 42 to a close position 43 having an interpersonal angle D9 (the close distance: for example, about 30 cm). Here, the interpersonal angle takes the predetermined appropriate side-by-side angle Ang.2 stored in the interpersonal position knowledge DB 18 or the side-by-side angle, at which the relation with the partner is good, calculated on the basis of the communication history.

As illustrated in the lower part of FIG. 20, in a case in which the mobile body 1b had a bad relationship with the partner when the mobile body 1b approached the partner and became side-by-side with the partner in the past (that is, the partner had negative emotion), that mobile body 1b controls so as not to approach the target person 2 and become side-by-side with the target person 2 and stops at the current position 42 having an interpersonal distance D10 (the proximate phase: for example, about 50 cm) even when the target person 2 currently smiles (that is, has a positive emotion). Here, the interpersonal angle takes the predetermined appropriate angle Ang.1 stored in the interpersonal position knowledge DB 18 or the angle, at which the relation with the partner is good, calculated on the basis of the communication history.

As described above, when it is estimated that the current emotion of the target person 2 is positive emotion, by referring to the past communication history with the target person 2, the mobile body 1b can appropriately determine whether to further approach the target person 2 and become side-by-side with the target person 2, and more reliably avoid causing the target person 2 stress.

<2-3. Third Embodiment>

Next, a mobile body control system according to a third embodiment of the present disclosure will be described with reference to FIGS. 21 to 29. In the present embodiment, a mobile body 1c moves to a more appropriate position by estimating surrounding atmosphere based on emotion of a person who is present around the target person 2, in addition to emotion of the target person 2, thereby communicating with the target person 2 without causing the target person 2 or the surrounding person stress.

(2-3-1. Configuration)

Figure 21:
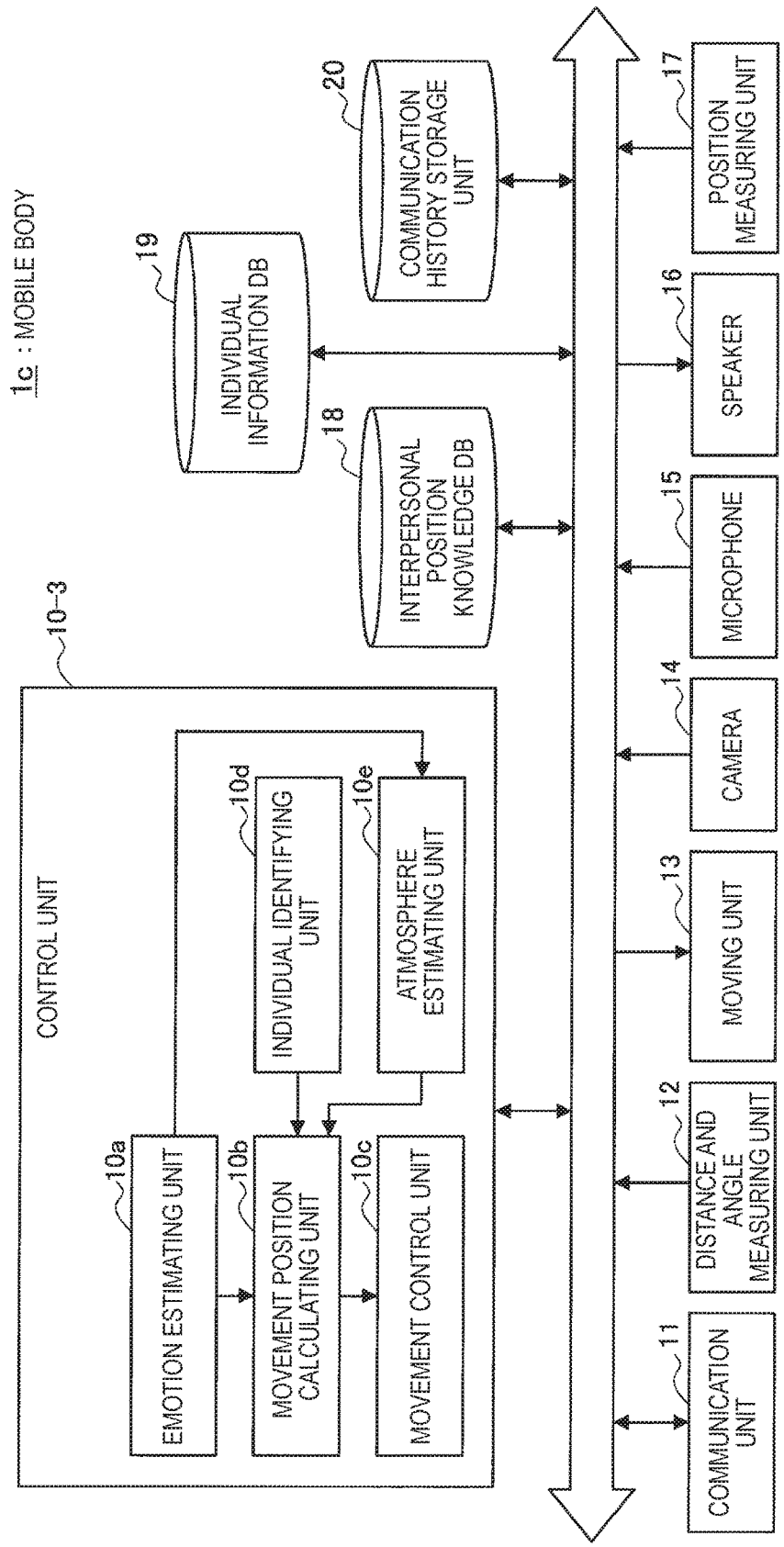
FIG. 21 is a block diagram illustrating an example of a configuration of a mobile body according to a third embodiment.

FIG. 21 is a block diagram illustrating an example of a configuration of the mobile body 1c according to the third embodiment. As illustrated in FIG. 21, the mobile body 1c according to the present embodiment includes a control unit 10-3, the communication unit 11, the distance and angle measuring unit 12, the moving unit 13, the camera 14, the microphone 15, the speaker 16, the position measuring unit 17, the interpersonal position knowledge DB 18, the individual information DB 19, and the communication history storage unit 20.

The control unit 10-3 is configured by a microcomputer having a CPU, a ROM, a RAM, and a nonvolatile memory and controls each configuration of the mobile body 1c. Further, as illustrated in FIG. 21, the control unit 10-3 functions as the emotion estimating unit 10a, the movement position calculating unit 10b, the movement control unit 10c, the individual identifying unit 10d, and an atmosphere estimating unit 10e.

The atmosphere estimating unit 10e has a function of estimating surrounding atmosphere of the target person 2. For example, the atmosphere estimating unit 10e estimates surrounding atmosphere (atmosphere is good/bad) on the basis of emotion of a person who is present around the target person 2 that is estimated by the emotion estimating unit 10a. Also, when estimating surrounding atmosphere on the basis of emotion of a surrounding person, the atmosphere estimating unit 10e may more accurately estimate the surrounding atmosphere by referring to a distance between the target person 2 and the surrounding person.

More specifically, the atmosphere estimating unit 10e may calculate the sum of emotions of people who are present around the target person 2 as the surrounding atmosphere. When emotion of a person is expressed using valence and arousal, the surrounding atmosphere may be calculated using Equation 1 below in which an influence due to a distance d (a distance between the target person 2 and a surrounding person or a distance between a plurality of surrounding people) is added to the normalized valence V and arousal A.

$$V = \sum_{i=0}^{n} \frac{v_i}{d_i^2}$$

$$A = \sum_{i=0}^{n} \frac{a_i}{d_i^2}$$

(Equation 1)

The surrounding atmosphere may also be calculated by further adding a place or situation (a public place, home, company, school, in a meeting, party, etc.).

The movement position calculating unit 10b calculates an appropriate movement position on the basis of emotion of the target person 2 estimated by the emotion estimating unit 10a and surrounding atmosphere of the target person 2 estimated by the atmosphere estimating unit 10e. When individual identification of the target person 2 is possible by the individual identifying unit 10d, the movement position calculating unit 10b may calculate an appropriate movement position on the basis of a communication history between the target person 2 and the mobile body 1c acquired from the communication history storage unit 20, in addition to the current emotion and surrounding atmosphere of the target person 2. The communication history storage unit 20 according to the present embodiment has a data structure that further includes atmospheric information in addition to the time stamp, the target 1, the target 2, the distance, the angle 1, the angle 2, the emotion 1, and the emotion 2.

The configuration of the mobile body 1c according to the present embodiment has been described above in detail.

Here, description of the same configurations as the mobile bodies 1a and 1b according to the first and second embodiments described with reference to FIG. 3 and FIG. 15 will be omitted. The configuration of the mobile body 1c according to the third embodiment is not limited to the configuration illustrated in FIG. 21, and for example, at least one of the emotion estimating unit 10a, the individual identifying unit 10d, the atmosphere estimating unit 10e, the individual information DB 19, and the communication history storage unit 20 may be present on a cloud.

(2-3-2. Operation)

Figure 22:
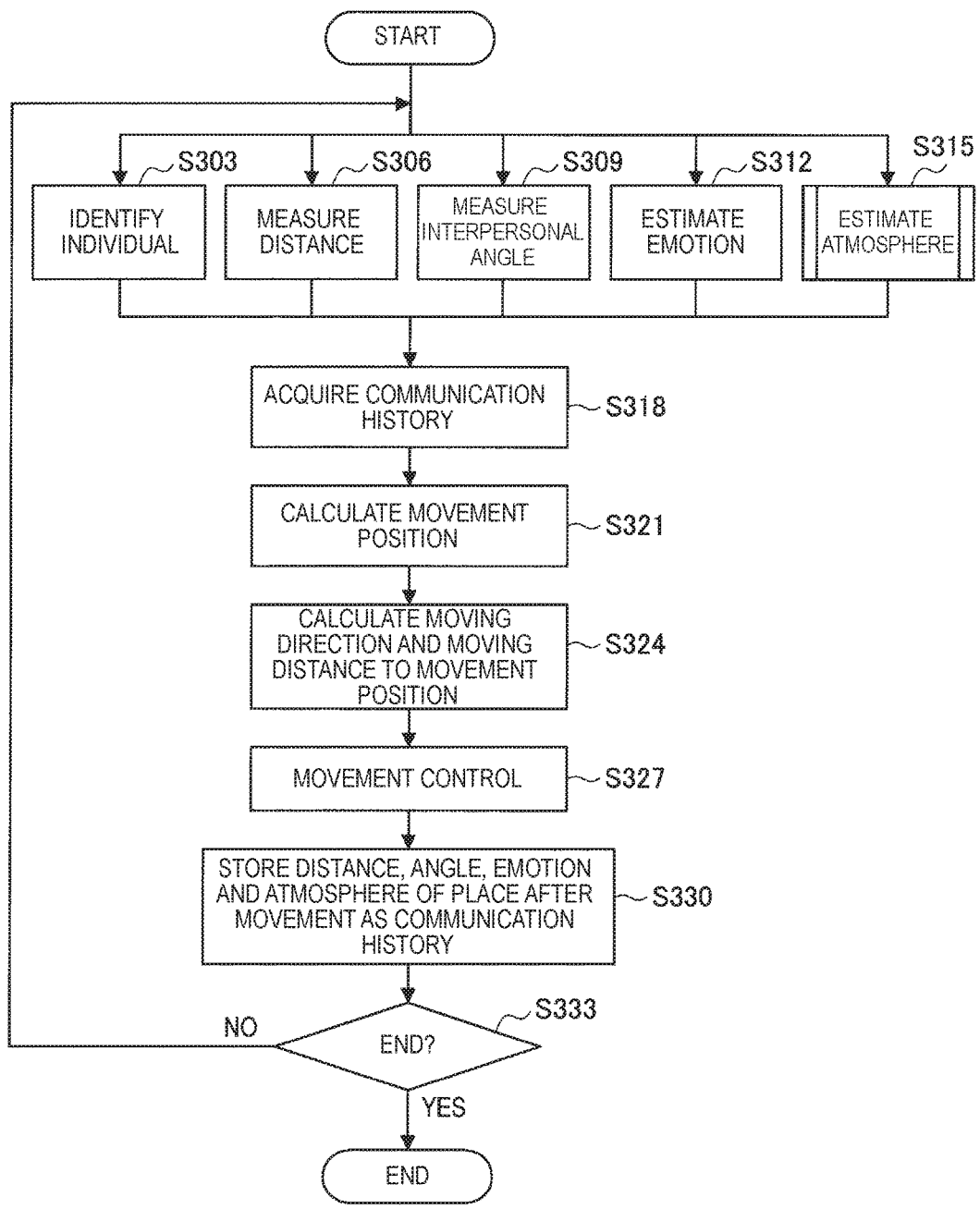
FIG. 22 is a flowchart illustrating a movement control process according to the third embodiment.

Next, an operation process of the mobile body control system according to the third embodiment will be described with reference to FIG. 22. FIG. 22 is a flowchart illustrating a movement control process according to the third embodiment. As illustrated in FIG. 22, first, the control unit 10-3 of the mobile body 1c performs individual identification of the communication target (the target person 2) by the individual identifying unit 10d (step S303). Also, the control unit 10-3 measures an interpersonal distance with the target person 2 by the distance and angle measuring unit 12 (step S306), measures an interpersonal angle (step S309), and estimates emotion of the target person 2 by the emotion estimating unit 10a (step S312). Also, the control unit 10-3 estimates surrounding atmosphere of the target person 2 by the atmosphere estimating unit 10e (step S315). An atmosphere estimation process will be described below with reference to FIG. 23. Steps S303 to S315 may be performed substantially at the same time.

Then, the movement position calculating unit 10b of the mobile body 1c acquires a communication history between the target person 2 and the mobile body 1b from the communication history storage unit 20 on the basis of the individual ID of the target person 2 when the target person 2 can be identified (step S318).

Then, the movement position calculating unit 10b calculates a movement position on the basis of the estimated current atmosphere around the target person 2 (step S321). Here, the movement position calculating unit 10b calculates a movement position on the basis of movement control data corresponding to pre-registered surrounding atmosphere by referring to the interpersonal position knowledge DB 18. When the communication history can be obtained by step S318, the movement position calculating unit 10b may also calculate a movement position with reference to the communication history. For example, even in a case in which the target person 2 currently smiles and has positive emotion, when the surrounding atmosphere of the target person 2 is bad (when multiple people present around the target person 2 have negative emotions), the movement position calculating unit 10b calculates a position receding from the target person 2 as a movement position or does not calculate a movement position so as not to move from the current position with reference to the interpersonal position knowledge DB 18. On the other hand, when the surrounding atmosphere of the target person 2 is good (when multiple people present around the target person 2 have positive emotions) in the case in which the target person 2 currently smiles and has positive emotion, the movement position calculating unit 10b calculates a position closer to the target person 2 than the current position as a movement position. In this way, the mobile body 1c according to the present embodiment can calculate a movement position corresponding to whether the atmosphere around the target person 2 is good or bad. By this, the mobile body 1c can avoid a behavior of causing the target person 2 or a surrounding person stress, as, for example, when communicating with the target person 2 in the vicinity of or in close contact with the target person 2 in a situation in which the atmosphere is bad.

Then, on the basis of the current interpersonal distance and interpersonal angle with the target person 2, the movement control unit 10c calculates a moving direction and a moving distance to the movement position calculated by the movement position calculating unit 10b in step S321 (step S324).

Then, with respect to the moving unit 13, the movement control unit 10c executes a movement control command to move to the movement position (step S327).

Then, the control unit 10-3 controls an interpersonal distance, an interpersonal angle, emotion of the target person 2, and information on surrounding atmosphere after the movement to be stored in the communication history storage unit 20 as a communication history together with a time stamp (step S330).

Then, steps S303 to S330 are repeated until a predetermined end condition (for example, reception of an end command by voice or gesture, time limit, end instruction, etc.) is satisfied (step S333).

An example of a movement control process according to the present embodiment has been described above. Next, the atmosphere estimation process illustrated in step S315 will be described in detail with reference to FIG. 23.

Figure 23:
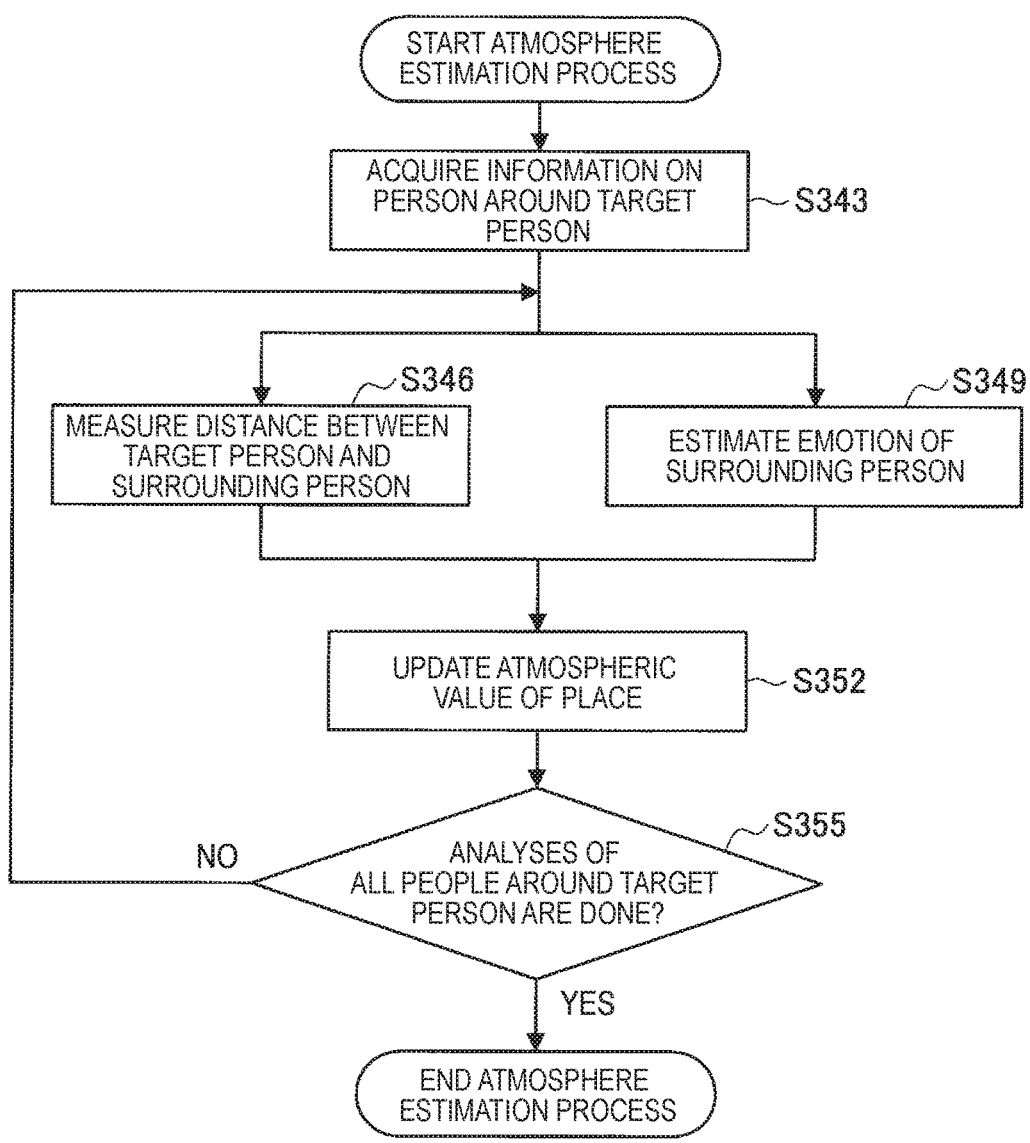
FIG. 23 is a flowchart illustrating an atmosphere estimation process according to the third embodiment.

FIG. 23 is a flowchart illustrating the atmosphere estimation process according to the present embodiment. As illustrated in FIG. 23, first, the mobile body 1c acquires information on a person who is present around the target person 2 (step S343). Specifically, the mobile body 1c acquires a captured image, collected voice, distance measuring information, and the like of a person who is present around the target person 2 by various sensors (the distance and angle measuring unit 12, the camera 14, the microphone 15) provided in the mobile body 1c.

Then, the distance and angle measuring unit 12 measures a distance between the target person 2 and the surrounding person (step S346). For example, the distance and angle measuring unit 12 may calculate the distance between the target person 2 and the surrounding person using triangulation.

Then, the emotion estimating unit 10a estimates emotion of the surrounding person on the basis of the acquired captured image or collected voice (step S349).

Then, the atmosphere estimating unit 10e estimates the surrounding atmosphere on the basis of the estimated emotion of the surrounding person and the distance between the surrounding person and the target person 2 and updates an atmospheric value (for example, a total value of negative/positive emotions) (step S352).

Then, steps S346 to S352 are repeated until analyses of all people around the target person 2 are done (step S355).

As described above, in the present embodiment, a surrounding atmospheric value is calculated on the basis of emotion of a surrounding person of the target person 2 and a distance between the target person 2 and the surrounding person (that is, atmosphere is estimated).

(2-2-3. Example of Controlling Movement)

Next, with respect to movement control of the mobile body 1c in accordance with surrounding atmosphere according to the third embodiment, a plurality of detailed examples of controlling movement will be described below.

EXAMPLE 1

Example of Controlling Movement Using Interpersonal Position Knowledge DB 18

The movement position calculating unit 10b of the mobile body 1c can calculate a movement position with reference to the interpersonal position knowledge DB 18 on the basis of estimated surrounding atmosphere. Hereinafter, movement control content stored in the interpersonal position knowledge DB 18 will be described with reference to FIGS. 24 to 26.

Figure 24:
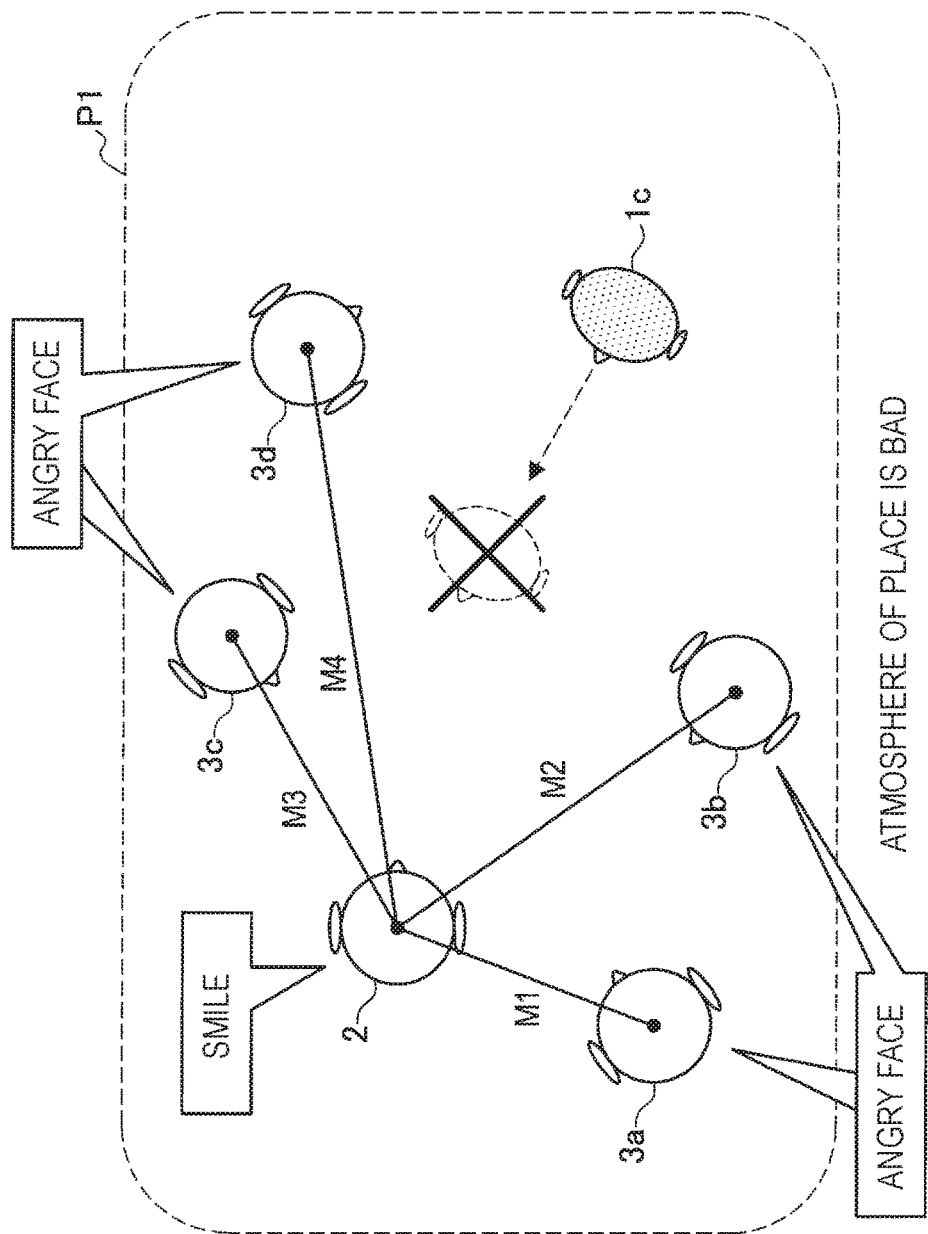
FIG. 24 is a view for describing an example of controlling movement of the mobile body in a case in which a surrounding atmosphere is bad according to the third embodiment.

FIG. 24 is a view illustrating an example of controlling movement of the mobile body 1c in a case in which surrounding atmosphere is bad. As illustrated in FIG. 24, even if the target person 2 smiles and has positive emotion, when atmosphere of a surrounding place P1 based on emotions of people 3a to 3d around the target person 2 is estimated as bad, the mobile body 1c controls so as not to approach the target person 2. For example, the mobile body 1c maintains the remote phase of the individual distance (about 1 m) and takes the predetermined angle Ang.1 that does not give stress to the partner as an interpersonal angle. The atmosphere of the surrounding place P1 can be calculated by adding an influence due to distances (distances M1 to M4) from the people 3a to 3d to the target person 2 to the emotions of the surrounding people 3a to 3d. In the case in which the atmosphere of the surrounding place P1 is estimated as bad, it is assumed that, for example, V is lower than a negative predetermined value in the sum of emotions (valences) of the surrounding people.

Figure 25:
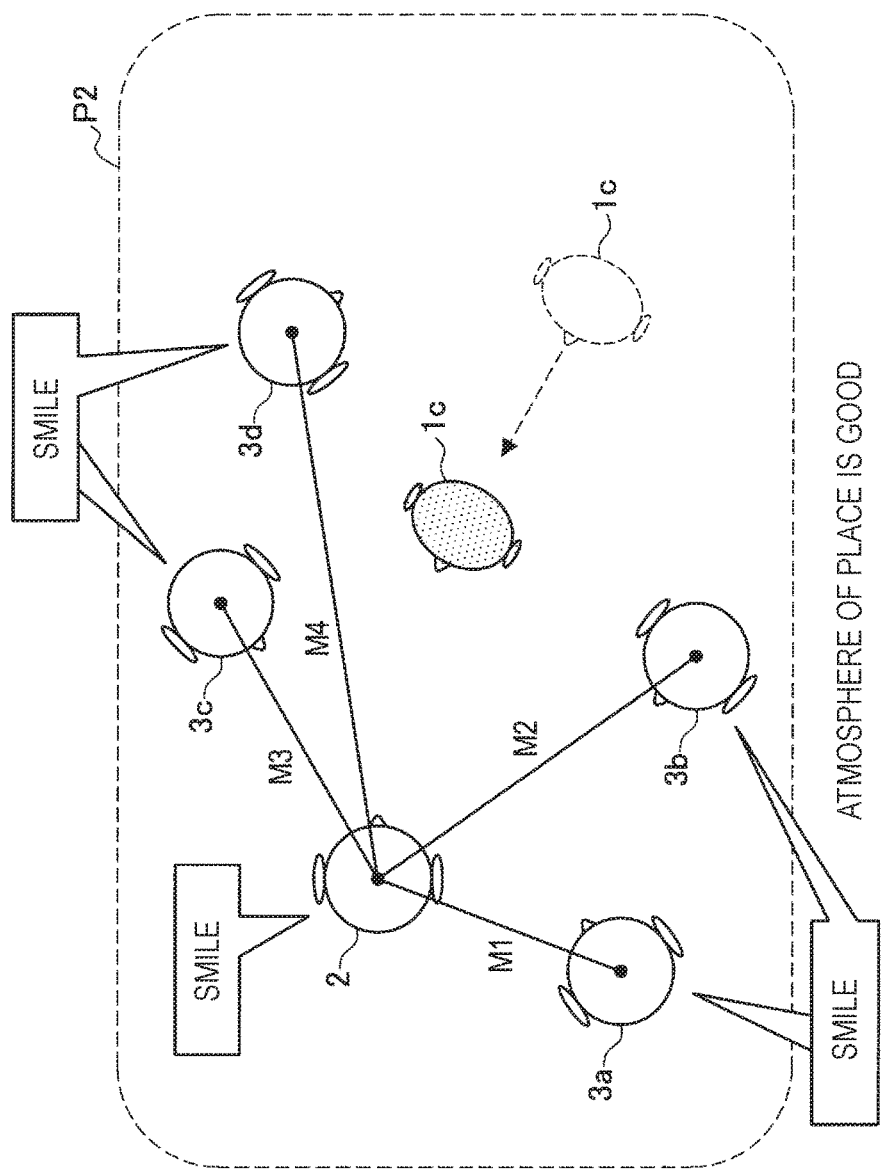
FIG. 25 is a view for describing an example of controlling movement of the mobile body in a case in which a surrounding atmosphere is good according to the third embodiment.

FIG. 25 is a view illustrating an example of controlling movement of the mobile body 1c in a case in which surrounding atmosphere is good. As illustrated in FIG. 25, when the target person 2 smiles and has positive emotion, and atmosphere of a surrounding place P2 based on emotions of people 3a to 3d around the target person 2 is estimated as good, the mobile body 1c controls so as not to approach the target person 2. For example, the mobile body 1c approaches the target person 2 and forms a familiar relationship with the target person 2. For example, the mobile body 1c maintains the proximate phase of the individual distance (about 50 cm) and takes the predetermined angle Ang.1 that does not give stress to the partner as an interpersonal angle. When the target person 2 smiles and the surrounding atmosphere is good even when the mobile body 1c is at about 50 cm from the target person 2, the mobile body 1c further approaches the target person 2, approaches the target person 2 and becomes side-by-side with the target person 2 with the remote phase of the close distance (about 30 cm) as a limit, and performs familiar communication with the target person 2. The atmosphere of the surrounding place P2 can be calculated by adding an influence due to distances (distances M1 to M4) from the people 3a to 3d to the target person 2 to the emotions of the surrounding people 3a to 3d. In the case in which the atmosphere of the surrounding place P1 is estimated as good, it is assumed that, for example, V is a positive first threshold value or larger and less than a positive second threshold value in the sum of emotions (valences) of the surrounding people.

Figure 26:
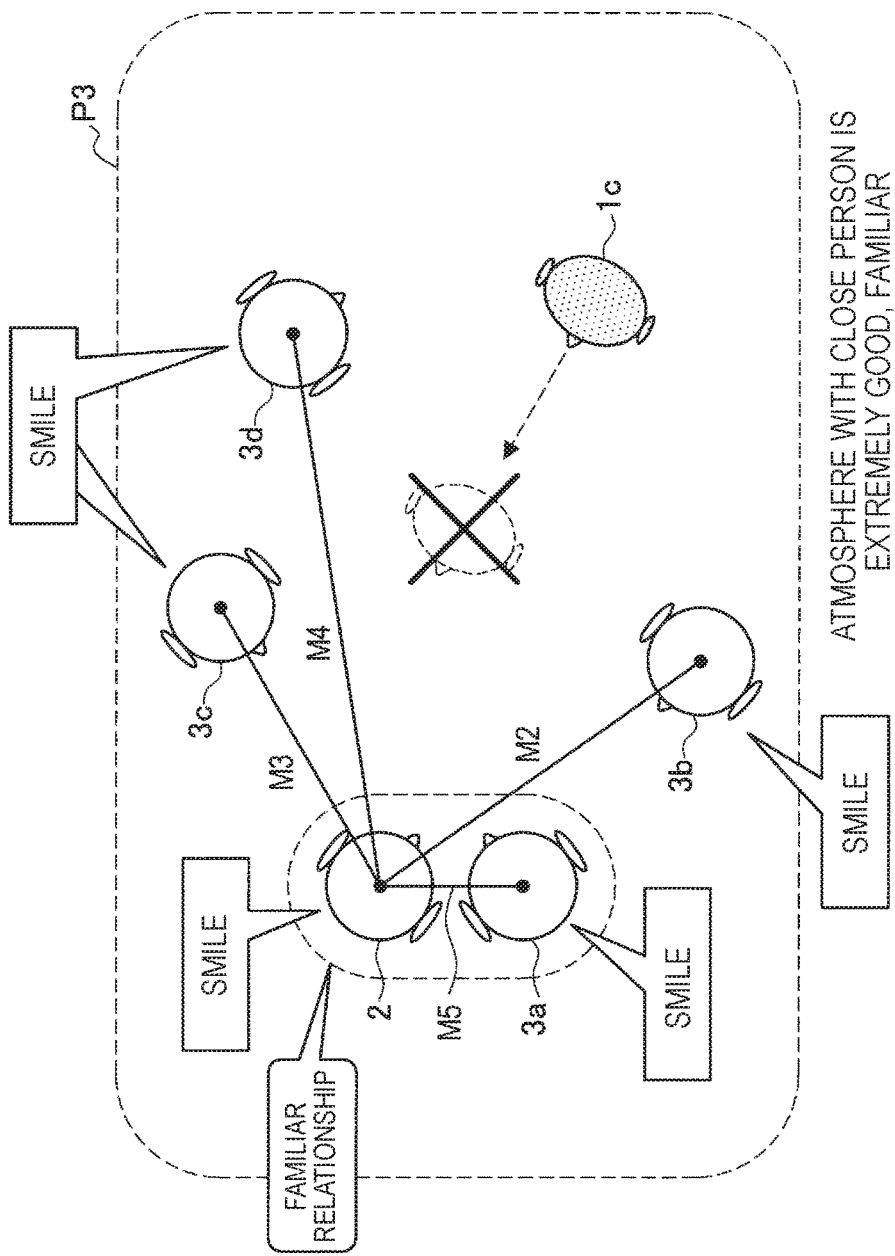
FIG. 26 is a view for describing an example of controlling movement of the mobile body in a case in which an atmosphere between a target person and a person close to the target person is extremely good according to the third embodiment.

FIG. 26 is a view for describing an example of controlling movement of the mobile body 1c in a case in which an atmosphere between the target person 2 and a person close to the target person 2 is extremely good. As illustrated in FIG. 26, even if the target person 2 smiles and has positive emotion, when atmosphere between the target person 2 and a person 3a close to the target person 2 is estimated as extremely good atmosphere (that is, familiar atmosphere), the mobile body 1c controls so as not to approach the target person 2. For example, the mobile body 1c maintains the proximate phase of the individual distance (about 50 cm) and takes the predetermined angle Ang.1 that does not give stress to the partner as an interpersonal angle. In the extremely good atmosphere, it is assumed that, for example, V is the positive second threshold value or larger in the sum of emotions (valences) of the surrounding people. As illustrated in FIG. 26, because a distance M5 between the target person 2 and the person 3a close to the target person 2 is small, the "total of emotions (valences) of the surrounding people" calculated by the square of the distance as shown in Equation 1 above becomes extremely large and is assumed to exceed the second threshold value.

Figure 27:
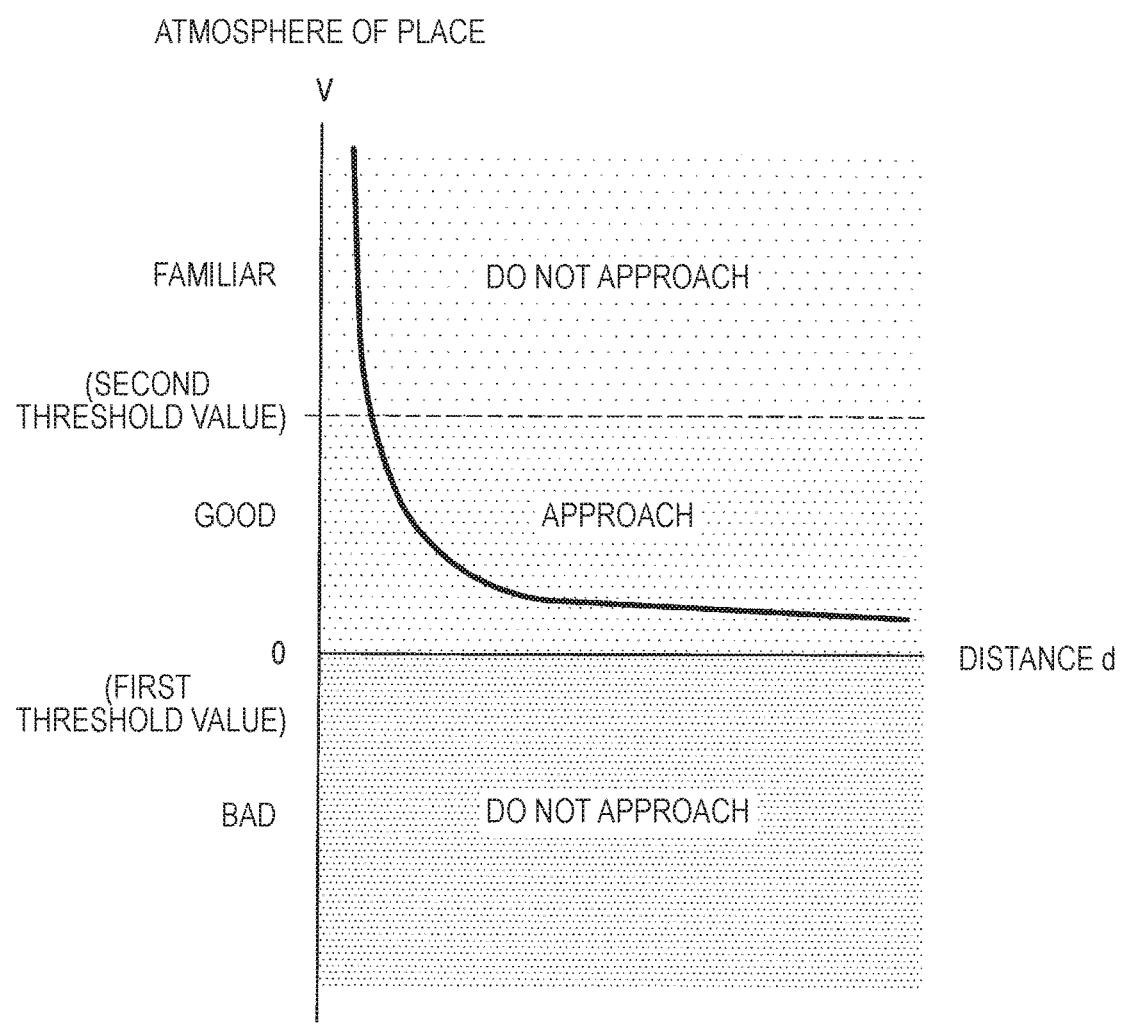
FIG. 27 is a graph illustrating an example of the relationship between an atmosphere V of a surrounding place and an interpersonal distanced d between the mobile body and a target person according to the third embodiment.

The above-described relationship between the atmosphere V of the surrounding place and the interpersonal distance d between the mobile body 1c and the target person 2 is shown in the graph of FIG. 27. FIG. 27 is a graph illustrating an example of the relationship between the atmosphere V of the surrounding place and the interpersonal distance d between the mobile body 1c and the target person 2.

As illustrated in FIG. 27, when the atmosphere V of the place is lower than a negative predetermined value (here, the same as the first threshold value) (that is, the atmosphere is bad), the mobile body 1c controls so as not to approach the target person 2. When the atmosphere V of the place is the positive first threshold value or larger and is lower than the positive second threshold value (that is, the atmosphere is good), the mobile body 1c controls to approach the target person 2 and perform familiar communication with the target person 2. When the atmosphere V of the place is the positive second threshold value or larger (that is, the atmosphere is extremely good and familiar), the mobile body 1c controls so as not to approach the target person 2.

In this way, in addition to emotion of the target person 2, by adjusting an interpersonal distance and an interpersonal angle with the target person 2 in accordance with atmosphere of a place, the mobile body 1c may not give stress to the partner or the surroundings.

EXAMPLE 2

Example of Controlling Movement Using Communication History Storage Unit 20

Although movement control is performed in accordance with emotion of a partner or atmosphere of a place (the total value of emotions of surrounding people) in accordance with movement control content pre-stored in the interpersonal position knowledge DB 18 in the above-described example, the present embodiment is not limited thereto. For example, more appropriate movement control may be performed on the basis of the communication history with the target person 2 stored in the communication history storage unit 20. Hereinafter, this will be described in detail with reference to FIGS. 28 and 29.

FIG. 28 is a view illustrating an example of movement control based on a communication history according to the present embodiment. movement control of the mobile body 1c when the target person 2 smiles and atmosphere of a place P4 is good (surrounding people also have smiles on their faces and have positive emotions) will be described in FIG.

28. The mobile body 1*c* inquires the communication history storage unit 20 of emotion of the target person 2 or surrounding atmosphere when the mobile body 1*c* approaches closer to the target person 2 than the current point in a situation in which the target person 2 smiles and the surrounding atmosphere is also good. If emotion of the target person 2 was positive when the mobile body 1*c* approached the target person 2 in the same situation in the past, as illustrated in the upper part of FIG. 28, the mobile body 1*c* controls movement to approach closer to the target person 2 than the current position. On the other hand, if emotion of the target person 2 was negative when the mobile body 1*c* approached the target person 2 in the same situation in the past, as illustrated in the lower part of FIG. 28, the mobile body 1*c* may control so as not to approach the target person 2 even when the target person 2 currently smiles and the surrounding atmosphere is good, thereby not causing the target person 2 stress.

FIG. 29 is a view illustrating an example of movement control based on a communication history according to the present embodiment. movement control of the mobile body 1*c* when the target person 2 smiles and atmosphere of a place P5 is bad (surrounding people have angry faces and have negative emotions) will be described in FIG. 29. The mobile body 1*c* inquires the communication history storage unit 20 of emotion of the target person 2 or surrounding atmosphere when the mobile body 1*c* approaches closer to the target person 2 than the current point in a situation in which the target person 2 smiles and the surrounding atmosphere is bad. If emotion of the target person 2 was negative when the mobile body 1*c* approached the target person 2 in the same situation in the past, as illustrated in the upper part of FIG. 29, the mobile body 1*c* controls so as not to approach the target person 2 more than the current position, thereby not causing the target person 2 stress. On the other hand, if emotion of the target person 2 was positive when the mobile body 1*c* approached the target person 2 in the same situation in the past, as illustrated in the lower part of FIG. 29, the mobile body 1*c* may control movement to approach the target person 2 even when the surrounding atmosphere is bad.

«3. Summary»

As described above, in a mobile body control system according to an embodiment of the present disclosure, the mobile body 1 moves to an appropriate interpersonal distance and interpersonal angle in accordance with emotion of the target person 2, who is a communication target, so that the mobile body 1 does not give psychological stress to the target person 2 and performs comfortable communication with the target person 2.

When a communication history with the target person 2 is being accumulated, by referring to the communication history, the mobile body 1 can move to a more appropriate position and can perform comfortable communication with the target person 2 without causing the target person 2 psychological stress.

By taking into consideration atmosphere of a place based on emotion of a surrounding person of the target person 2, the mobile body 1 can move to a more appropriate position and can perform comfortable communication with the target person 2 without causing the target person 2 or the surrounding person psychological stress.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing the function of the mobile body 1 to be exerted on hardware such as a CPU, a ROM, a RAM, and the like incorporated in the mobile body 1 described above. A computer-readable storage medium storing the computer program is also provided.

Further, the mobile body control system according to the present embodiment may be a mobile body system in which at least a part of the configuration of the mobile body 1 is located on a cloud.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A mobile body control system including:

a moving unit configured to move;

a measuring unit configured to measure an angle and a distance with a target which is a communication target;

an emotion estimating unit configured to estimate an emotion of the target; and a control unit configured to control the moving unit to move a mobile body to an initial position with an appropriate angle and distance with respect to the target in accordance with the estimated emotion.

(2)

The mobile body control system according to (1), in which, when the emotion estimating unit estimates that the target has a positive emotion, the control unit controls the moving unit to move the mobile body to a first proximate position at which a distance to the target is closer than at the initial position, without changing an angle with respect to the target.

(3)

The mobile body control system according to (2), in which, when the emotion estimating unit estimates that the target has a positive emotion when the mobile body is at the first proximate position, the control unit controls the moving unit to move the mobile body to a second proximate position at which a distance to the target is closer than at the first proximate position, while changing the angle with respect to the target.

(4)

The mobile body control system according to (3), in which the control unit controls the moving unit so that the mobile body changes from an angle at which the mobile body is face-to face with the target at the first proximate position to an angle at which the mobile body is side-by-side with the target at the second proximate position.

(5)

The mobile body control system according to (3) or (4), in which, when the emotion estimating unit estimates that the target has a negative emotion when the mobile body is at the second proximate position, the control unit controls the moving unit to move to the first proximate position, while changing the angle with respect to the target.

(6)

The mobile body control system according to (2), in which, when the emotion estimating unit estimates that the target has a negative emotion when the mobile body is at the first proximate position, the control unit controls the moving unit to move to the initial position, without changing the angle with respect to the target.

(7)
The mobile body control system according to any one of (2) to (6), in which, when the emotion estimating unit estimates that the target has a negative emotion, the control unit controls the moving unit to change an angle of the mobile body with respect to the target.

(8)
The mobile body control system according to (7), in which the control unit controls the moving unit to increase the angle of the mobile body with respect to the target.

(9)
The mobile body control system according to any one of (1) to (8), further including:
an identifying unit configured to perform individual identification of the target; and
a storage control unit configured to control an angle and a distance between the mobile body and the target measured by the measuring unit and an emotion of the target when the mobile body is located at the angle and the distance to be stored, for each identified individual, as history information in a storage unit,
in which the control unit controls the moving unit to move to an appropriate position with respect to the target on the basis of the history information on the angle and the distance with the target and the emotion of the target stored in the storage unit.

(10)
The mobile body control system according to (9), in which, even when the target currently has a positive emotion, the control unit controls whether to move to a third proximate position at which a distance to the target is closer than at the current position of the mobile body on the basis of the history information.

(11)
The mobile body control system according to any one of (1) to (10), further including
an atmosphere estimating unit configured to estimate a surrounding atmosphere of the target,
in which the control unit controls the moving unit to move to an appropriate position with respect to the target on the basis of the surrounding atmosphere.

(12)
The mobile body control system according to (11), in which the atmosphere estimating unit estimates the surrounding atmosphere of the target on the basis of an emotion of another target located around the target.

(13)
The mobile body control system according to (12), in which the atmosphere estimating unit estimates the surrounding atmosphere of the target on the basis of a distance between the other target located around the target and the target or a distance between a plurality of other targets, and the emotion of the other target.

(14)
The mobile body control system according to any one of (11) to (13), in which the control unit controls the mobile body to move to an appropriate position with respect to the target on the basis of the current surrounding atmosphere and history information including an angle and a distance with the target, a surrounding atmosphere, and an emotion of the target in the past stored in a storage unit.

(15)
The mobile body control system according to any one of (1) to (14), in which the appropriate initial position has a preset distance and angle.

(16)
A control method including:
measuring, by a measuring unit, an angle and a distance with a target which is a communication target;
estimating an emotion of the target; and
controlling a moving unit, by a control unit, to move a mobile body to an initial position with an appropriate angle and distance with respect to the target in accordance with the estimated emotion.

(17)
A storage medium having a program stored therein, the program causing a computer to function as:
a moving unit configured to move;
a measuring unit configured to measure an angle and a distance with a target which is a communication target;
an emotion estimating unit configured to estimate an emotion of the target; and
a control unit configured to control the moving unit to move a mobile body to an initial position with an appropriate angle and distance with respect to the target in accordance with the estimated emotion.

REFERENCE SIGNS LIST 1, 1a, 1b, 1c mobile body
10, 10-1 to 10-3 control unit
10a emotion estimating unit
10b movement position calculating unit
10c motion control unit
10d individual identifying unit
10e atmosphere estimating unit
11 communication unit
12 distance and angle measuring unit
13 moving unit
14 camera
15 microphone
16 speaker
17 position measuring unit
18 interpersonal position knowledge DB
19 individual information DB
20 communication history storage unit

The invention claimed is:
1. A mobile body control system, comprising:
a moving unit configured to move a mobile body;
a measuring unit configured to measure an angle and a distance of the mobile body with respect to a first target which is a communication target;
an emotion estimating unit configured to estimate an emotion of the first target; and
a control unit configured to:
control the moving unit to move the mobile body to an initial position having a first angle and a first distance with respect to the first target, wherein the first angle and the first distance is based on the estimated emotion; and
control the moving unit to move the mobile body to a first proximate position based on an estimation, by the emotion estimating unit, that the emotion of the first target is a positive emotion, wherein
the first proximate position is at a second distance to the first target,
the second distance is closer to the first target than the first distance, and the mobile body is moved to the first proximate position without a change in the first angle with respect to the first target.

2. The mobile body control system according to claim 1, wherein,
based on an estimation, by the emotion estimating unit, that the emotion of the first target is the positive emotion when the mobile body is at the first proximate position, the control unit is further configured to control the moving unit to move the mobile body to a second proximate position,
the second proximate position is at a third distance to the first target,
the third distance is closer to the first target than the second distance at the first proximate position, and
the mobile body is moved to the second proximate position with a change in the first angle with respect to the first target.

3. The mobile body control system according to claim 2, wherein the control unit is further configured to control the moving unit to move the mobile body so that a second angle at which the mobile body is face-to face with the first target at the first proximate position is changed to a third angle at which the mobile body is side-by-side with the first target at the second proximate position.

4. The mobile body control system according to claim 3, wherein
based on an estimation, by the emotion estimating unit, that the emotion of the first target is a negative emotion when the mobile body is at the second proximate position,
the control unit is further configured to control the moving unit to move the mobile body to the first proximate position, and
the mobile body is moved to the first proximate position with a change in the third angle with respect to the first target.

5. The mobile body control system according to claim 1, wherein,
based on an estimation, by the emotion estimating unit, that the emotion of the first target is a negative emotion when the mobile body is at the first proximate position, the control unit is further configured to control the moving unit to move the mobile body to the initial position, and
the mobile body is moved to the initial position without a change in the first angle with respect to the first target.

6. The mobile body control system according to claim 1, wherein,
based on an estimation, by the emotion estimating unit, that the emotion of the first target is a negative emotion, the control unit is further configured to control the moving unit to move the mobile body to change the first angle of the mobile body with respect to the first target.

7. The mobile body control system according to claim 6, wherein the control unit is further configured to control the moving unit to move the mobile body to increase the first angle of the mobile body with respect to the first target.

8. The mobile body control system according to claim 1, further comprising:
an identifying unit configured to identify the first target; and
a storage control unit configured to store an angle and a distance between the mobile body and the first target measured by the measuring unit and an emotion of the first target when the mobile body is located at the angle and the distance, wherein the angle and the distance between the mobile body and the first target is stored in a storage unit as history information,
wherein the control unit is further configured to control the moving unit to move the mobile body with respect to the first target based on the history information stored in the storage unit.

9. The mobile body control system according to claim 8, wherein
based on the positive emotion of the first target, the control unit is further configured to control the moving unit to move the mobile body to a third proximate position based on the stored history information,
the third proximate position is at a fourth distance to the first target, and
the fourth distance is closer to the first target than at a current position of the mobile body.

10. The mobile body control system according to claim 1, further comprising:
an atmosphere estimating unit configured to estimate a surrounding atmosphere of the first target,
wherein the control unit is further configured to control the moving unit to move the mobile body with respect to the first target based on the surrounding atmosphere.

11. The mobile body control system according to claim 10, wherein
the atmosphere estimating unit is further configured to estimate the surrounding atmosphere of the first target based on an emotion of a second target, and
the second target is located around the first target.

12. The mobile body control system according to claim 11, wherein the atmosphere estimating unit is further configured to estimate the surrounding atmosphere of the first target based on a distance between the second target and the first target or a distance between a plurality of targets and the first target, and the emotion of the second target.

13. The mobile body control system according to claim 10, wherein
the control unit is further configured to control the moving unit to move the mobile body with respect to the first target based on the surrounding atmosphere and history information, and
the history information includes an angle and a distance with respect to the first target, the surrounding atmosphere, and a past emotion of the first target stored in a storage unit.

14. The mobile body control system according to claim 1, wherein the first distance at the initial position is a determined distance and the first angle at the initial position is a determined angle.

15. A control method, comprising:
measuring, by a measuring unit, an angle and a distance of a mobile body with respect to a target which is a communication target;
estimating, by an emotion estimating unit, an emotion of the target;
controlling a moving unit, by a control unit, to move the mobile body to an initial position having an angle and a first distance with respect to the target, wherein the angle and the first distance is based on the estimated emotion; and
controlling the moving unit, by the control unit, to move the mobile body to a proximate position based on an estimation that the emotion of the target is a positive emotion, wherein
the proximate position is at a second distance to the target, the second distance is closer to the target than the first distance, and the mobile body is moved to the proximate position without a change in the angle with respect to the target.

16. A non-transitory computer-readable medium having stored thereon, computer-executable instructions which when executed by a computer cause the computer to execute operations, the operations comprising:

measuring an angle and a distance of a mobile body with a target which is a communication target;

estimating an emotion of the target;

controlling a moving unit to move the mobile body to an initial position having an angle and a first distance with respect to the target, wherein the angle and the first distance is based on the estimated emotion; and controlling the moving unit to move the mobile body to a proximate position based on an estimation that the emotion of the target is a positive emotion, wherein the proximate position is at a second distance to the target, the second distance is closer to the target than the first distance, and the mobile body is moved to the proximate position without a change in the angle with respect to the target.

17. A mobile body control system, comprising:

a moving unit configured to move a mobile body;

a measuring unit configured to measure an angle and a distance of the mobile body with respect to a target which is a communication target;

an emotion estimating unit configured to estimate an emotion of the target; and a control unit configured to:

control the moving unit to move the mobile body to an initial position having an angle and a first distance with respect to the target, wherein the angle and the first distance is based on the estimated emotion; and control the moving unit to move the mobile body to change the angle of the mobile body with respect to the target based on an estimation, by the emotion estimating unit, that the emotion of the target is a negative emotion.

* * * * *